United States Patent
Ding et al.

(10) Patent No.: US 12,501,797 B2
(45) Date of Patent: Dec. 16, 2025

(54) FOLDABLE DISPLAY APPARATUS, MANUFACTURING METHOD THEREFOR, AND TERMINAL DEVICE

(71) Applicant: Honor Device Co., Ltd., Shenzhen (CN)

(72) Inventors: Caihua Ding, Shenzhen (CN); Xianbo Zong, Shenzhen (CN); Xueping Guo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 405 days.

(21) Appl. No.: 18/253,274

(22) PCT Filed: Dec. 30, 2022

(86) PCT No.: PCT/CN2022/144302
§ 371 (c)(1),
(2) Date: May 17, 2023

(87) PCT Pub. No.: WO2023/202160
PCT Pub. Date: Oct. 26, 2023

(65) Prior Publication Data
US 2024/0373688 A1 Nov. 7, 2024

(30) Foreign Application Priority Data
Apr. 18, 2022 (CN) .......................... 202210405893.2

(51) Int. Cl.
*H10K 59/131* (2023.01)
*H04M 1/02* (2006.01)
(Continued)

(52) U.S. Cl.
CPC ........ *H10K 59/131* (2023.02); *H04M 1/0214* (2013.01); *H04M 1/0268* (2013.01);
(Continued)

(58) Field of Classification Search
CPC ............. H10K 59/131; H10K 59/1201; H10K 59/873; H10K 2102/311; H10K 77/111;
(Continued)

(56) References Cited

U.S. PATENT DOCUMENTS

| 10,069,092 B2 | 9/2018 | Minami et al. |
| 10,818,693 B2 | 10/2020 | Li et al. |

(Continued)

FOREIGN PATENT DOCUMENTS

| CN | 102568377 A | 7/2012 |
| CN | 107887696 A | 4/2018 |

(Continued)

*Primary Examiner* — J.E. Schoenholtz
(74) *Attorney, Agent, or Firm* — Conley Rose, P.C.

(57) ABSTRACT

A foldable display apparatus, a manufacturing method therefor, and a terminal device. The display apparatus includes a flexible display panel, a multi-layer protective structure, and a mainboard connection structure that is disposed inside the protective structure. The mainboard connection structure includes a metal wire disposed at a first protective layer of the protective structure, two ends of the metal wire respectively correspond to two screen areas of the display panel that are capable of being folded relative to each other, and are separately formed with bonding pads. Pad areas in which the bonding pads at the two ends of the metal wire are exposed are separately formed at the first protective layer. The bonding pads at the two ends of the metal wire are respectively electrically connected to two mainboards of the terminal device by using connecting pieces.

20 Claims, 21 Drawing Sheets

(51) Int. Cl.
 *H10K 59/12* (2023.01)
 *H10K 59/80* (2023.01)
 *H10K 102/00* (2023.01)

(52) U.S. Cl.
 CPC ...... *H04M 1/0277* (2013.01); *H10K 59/1201* (2023.02); *H10K 59/873* (2023.02); *H10K 2102/311* (2023.02)

(58) Field of Classification Search
 CPC ............ H04M 1/0214; H04M 1/0268; H04M 1/0277; G06F 1/1637; G06F 1/1652; G06F 1/1641; G09F 9/301; G09F 9/33
 See application file for complete search history.

(56) References Cited

U.S. PATENT DOCUMENTS

| | | | |
|---|---|---|---|
| 11,232,723 | B2 | 1/2022 | Li et al. |
| 2018/0342192 | A1 | 11/2018 | Lee et al. |
| 2019/0350081 | A1 | 11/2019 | Park et al. |
| 2020/0267839 | A1* | 8/2020 | Woo ..................... G06F 1/1681 |
| 2021/0247806 | A1* | 8/2021 | Lee ..................... G06F 1/1652 |
| 2022/0035410 | A1 | 2/2022 | Lee et al. |
| 2022/0140049 | A1 | 5/2022 | Bai et al. |
| 2022/0261039 | A1 | 8/2022 | Zhang et al. |
| 2023/0082293 | A1* | 3/2023 | Lv .......................... G06F 1/1656 361/679.01 |
| 2023/0161388 | A1* | 5/2023 | Park ........................ G06F 1/203 361/679.01 |
| 2023/0292565 | A1* | 9/2023 | Morino ............... H04M 1/0268 |
| 2024/0155048 | A1 | 5/2024 | Meng et al. |

FOREIGN PATENT DOCUMENTS

| | | |
|---|---|---|
| CN | 108172122 A | 6/2018 |
| CN | 108877534 A | 11/2018 |
| CN | 208401905 U | 1/2019 |
| CN | 209402552 U | 9/2019 |
| CN | 110473467 A | 11/2019 |
| CN | 210073179 U | 2/2020 |
| CN | 110942724 A | 3/2020 |
| CN | 210380959 U | 4/2020 |
| CN | 111128029 A | 5/2020 |
| CN | 112447792 A | 3/2021 |
| CN | 113572872 A | 10/2021 |
| CN | 114038330 A | 2/2022 |
| CN | 114242909 A | 3/2022 |
| WO | 2021189493 A1 | 9/2021 |

\* cited by examiner

CONT.
FROM
FIG. 15A

Form a shielding layer on a surface that is of the fourth protective layer and that is away from a display panel — 1511

Form an insulation layer at the shielding layer — 1512

Form a wiring layer at the insulation layer, where the wiring layer includes a metal wire; a position of a first end of the metal wire corresponds to a first screen area of the display panel, and is formed with a first bonding pad; and a position of a second end corresponds to a second screen area of the display panel, and is formed with a second bonding pad — 1513

Form a first protective layer at the wiring layer — 1514

Open a window at a position that is on the first protective layer and that is corresponding to the first bonding pad of the metal wire, to form a first pad area, so that the first bonding pad of the metal wire is exposed in the first pad area; and open a window at a position that is on the first protective layer and that is corresponding to the second bonding pad of the metal wire, to form a second pad area, so that the second bonding pad of the metal wire is exposed in the second pad area — 1515

Attach a cover plate on the polarizer — 1516

Separately dispose conductors in the first pad area and the second pad area — 1517

Weld a first end of a first connecting piece to the first pad area, so that the first end of the first connecting piece is electrically connected to the first bonding pad of the metal wire; and weld a first end of a second connecting piece to the second pad area, so that the first end of the second connecting piece is electrically connected to the second bonding pad of the metal wire — 1518

FIG. 15B

FOLDABLE DISPLAY APPARATUS, MANUFACTURING METHOD THEREFOR, AND TERMINAL DEVICE

CROSS-REFERENCE TO RELATED APPLICATIONS

This application is a U.S. National Stage of International Application No. PCT/CN2022/144302 filed on Dec. 30, 2022, which claims priority to Patent Application No. 202210405893.2, filed with the China National Intellectual Property Administration on Apr. 18, 2022, both of which are incorporated herein by reference in their entireties.

TECHNICAL FIELD

This application relates to the technical field of display panels, and particularly, to a foldable display apparatus, a manufacturing method therefor, and a terminal device.

BACKGROUND

A flexible organic light emitting diode (Flexible organic light emitting diode, OLED) promotes the development of terminal product forms such as a mobile phone, and flexible display products are constantly emerging. Products such as a foldable mobile phone and a foldable computer have been successively introduced by various terminal manufacturers, and a new breakthrough in display forms is achieved. A foldable-screen mobile phone has gradually become a heavyweight product for the terminal manufacturers to compete in the high-end market.

A foldable product uses a structure such as a rotating shaft to implement relative folding and relative unfolding of two bodies on both sides of the rotating shaft. Generally, the foldable product is also configured with two mainboards, and the two mainboards are respectively mounted on the two bodies on both the sides of the rotating shaft and are electrically connected by using a flexible printed circuit (Flexible Printed Circuit, FPC). Currently, the FPC generally crosses a rotating position between the two bodies and is connected to the two mainboards located on both sides of the rotating shaft by using both ends of the FPC, so that a part that is of the FPC and that is corresponding to the rotating shaft needs to be frequently bent or unfolded along with rotation of the rotating shaft. Therefore, a high requirement is imposed on assembly of the FPC, and the FPC is prone to damage after being bent, thereby causing a reliability problem. In addition, integration of the FPC on the rotating shaft also affects bending performance of the foldable product, and is not conducive to an overall thinning design of the foldable product.

SUMMARY

This application provides a foldable display apparatus, a manufacturing method therefor, and a terminal device. The terminal device integrates a mainboard connection structure at a back side of the display apparatus, and implements, by using the mainboard connection structure, an interconnection and signal transmission between two mainboards located on two foldable bodies of the terminal device, so that bending performance of the terminal device can be improved, reliability of the interconnection between the two mainboards is ensured, and a thinning design of the terminal device is further facilitated.

According to a first aspect, this application provides a foldable display apparatus. The foldable display apparatus includes a flexible display panel, a multi-layer protective structure, and a mainboard connection structure. The flexible display panel includes a first screen area and a second screen area that are capable of being folded relative to each other. The multi-layer protective structure is used to carry the display panel, and the multi-layer protective structure includes a first protective layer away from the display panel. The mainboard connection structure is disposed inside the multi-layer protective structure and includes a first connecting piece, a second connecting piece, and a wiring layer, an insulation layer, and a shielding layer that are stacked at the first protective layer in sequence. The shielding layer is closer to the display panel than the wiring layer, and the shielding layer entirely covers the wiring layer, so that it is possible to ensure, by using the shielding layer included in the mainboard connection structure, that a signal transmitted by the wiring layer does not affect normal operation of a circuit structure of the display panel. The wiring layer includes a metal wire. A position of a first end of the metal wire corresponds to the first screen area, and is formed with a first bonding pad. A position of a second end of the metal wire corresponds to the second screen area, and is formed with a second bonding pad. A first pad area in which the first bonding pad of the metal wire is exposed and a second pad area in which the second bonding pad is exposed are formed at the first protective layer. A first end of the first connecting piece is disposed in the first pad area and is electrically connected to the first bonding pad of the metal wire. A first end of the second connecting piece is disposed in the second pad area and is electrically connected to the second bonding pad of the metal wire.

The foldable display apparatus provided in this embodiment integrates the mainboard connection structure at a back side of the flexible display panel, and implements, by using the wiring layer included in the mainboard connection structure, an interconnection between two mainboards located on two foldable bodies of a terminal device. In this way, when the terminal device transmits, by using the wiring layer included in the mainboard connection structure, all signals exchanged between the two mainboards, all lines of a through-going shaft connecting piece may be transferred to the back side of the display panel without using the through-going shaft connecting piece, so that bending performance of the terminal device can be improved, and there is no reliability problem that the through-going shaft connecting piece is damaged after being bent. Therefore, reliability of the interconnection between the two mainboards can be ensured, and further an overall thickness of the terminal device can be reduced, thereby facilitating a thinning design of the terminal device. When the terminal device reserves the through-going shaft connecting piece and transmits, by using the wiring layer included in the mainboard connection structure, some signals exchanged between the two mainboards, some lines of the through-going shaft connecting piece may be transferred to the back side of the display panel, to reduce a thickness of the through-going shaft connecting piece, so that the terminal device has a smaller bending radius, bending performance is improved, reliability problems are reduced, and further an overall thickness of the terminal device is reduced, to implement the thinning design of the terminal device.

In an embodiment, the wiring layer includes a plurality of metal wires that are not connected to each other.

In an embodiment, the plurality of metal wires have similar wiring patterns, so that uniform wiring of the wiring layer can be facilitated. Alternatively, a wiring pattern of at least one of the plurality of metal wires is different from a wiring pattern of another metal wire in the plurality of metal wires. In this way, corresponding wiring can be flexibly performed at a wiring stage based on an impedance requirement, for wiring, of a signal transmitted by each metal wire.

Optionally, the plurality of metal wires are the same in width, or a width of at least one of the plurality of metal wires is greater than a width of another metal wire in the plurality of metal wires. It may be understood that when a width of the wire is increased, direct-current impedance of the wire can be reduced, and a through-current capability of the wire can be improved, so that metal wires with different through-current capabilities can be laid out at a same layer. For example, a through-current capability of a metal wire corresponding to a power supply signal is greater than a through-current capability of a metal wire corresponding to a common signal. Therefore, a width of the metal wire corresponding to the power supply signal needs to be greater than a width of the metal wire corresponding to the common signal.

Optionally, the plurality of metal wires are the same in thickness, or a thickness of at least one of the plurality of metal wires is greater than a thickness of another metal wire in the plurality of metal wires. It may be understood that when a thickness of the wire is increased, direct-current impedance of the wire can be reduced, and a through-current capability of the wire can be improved, so that metal wires with different through-current capabilities can be laid out at a same layer. For example, a thickness of the metal wire corresponding to the power supply signal needs to be greater than a thickness of the metal wire corresponding to the common signal.

In an embodiment, the first connecting piece includes a plurality of first transmission lines and a plurality of third bonding pads disposed at the first end of the first connecting piece, the plurality of third bonding pads are electrically connected to the plurality of first transmission lines in a one-to-one manner, and the plurality of third bonding pads are further electrically connected in a one-to-one manner to first bonding pads that are of the plurality of metal wires and that are exposed in the first pad area; and the second connecting piece includes a plurality of second transmission lines and a plurality of fourth bonding pads disposed at the first end of the second connecting piece, the plurality of fourth bonding pads are electrically connected to the plurality of second transmission lines in a one-to-one manner, and the plurality of fourth bonding pads are further electrically connected in a one-to-one manner to second bonding pads that are of the plurality of metal wires and that are exposed in the second pad area.

In an embodiment, the mainboard connection structure further includes conductors that are separately disposed in the first pad area and the second pad area; a conductor disposed in the first pad area is used to implement one-to-one electrical connections between the first bonding pads of the plurality of metal wires and the plurality of third bonding pads included in the first connecting piece; and a conductor disposed in the second pad area is used to implement one-to-one electrical connections between the second bonding pads of the plurality of metal wires and the plurality of fourth bonding pads included in the second connecting piece.

In an embodiment, the conductors are anisotropic conductive films, and the conductors are separately filled in the first pad area and the second pad area In this way, the conductor provides a conductive channel in a thickness direction of the display apparatus, and is insulated in a direction perpendicular to the thickness direction of the display apparatus. Therefore, the conductor filled in the first pad area can implement one-to-one electrical connections between the first bonding pads of the plurality of metal wires and the plurality of third bonding pads at the first end of the first connecting piece, can effectively avoid a short circuit between the plurality of metal wires, and can also avoid a short circuit between the plurality of first transmission lines included in the first connecting piece; and the conductor filled in the second pad area can implement one-to-one electrical connections between the second bonding pads of the plurality of metal wires and the plurality of fourth bonding pads at the first end of the second connecting piece, can effectively avoid a short circuit between the plurality of metal wires, and can also avoid a short circuit between the plurality of second transmission lines included in the second connecting piece.

Optionally, the conductors are brazing filler metals, and the conductors are separately coated on each first bonding pad and each second bonding pad of the plurality of metal wires.

In this way, through the conductor in the first pad area, signals on the plurality of third bonding pads at the first end of the first connecting piece can be longitudinally conducted to first bonding pads of corresponding metal wires and then input into the corresponding metal wires, or signals on the first bonding pads of the plurality of metal wires can be longitudinally conducted to corresponding third bonding pads of the first connecting piece and then input into corresponding first transmission lines. Through the conductor in the second pad area, signals on the second bonding pads of the plurality of metal wires can be longitudinally conducted to corresponding fourth bonding pads of the second connecting piece and then input into corresponding second transmission lines, or signals on the plurality of fourth bonding pads at the first end of the second connecting piece can be longitudinally conducted to second bonding pads of corresponding metal wires and then input into the corresponding metal wires.

In an embodiment, the multi-layer protective structure further includes a second protective layer and a third protective layer. The second protective layer is adjacent to the display panel, and both the first protective layer and the second protective layer are made of an insulating material. The third protective layer is located between the second protective layer and the shielding layer, and the third protective layer is made of a waterproof material. The first protective layer, the second protective layer, and the third protective layer are used to cooperate with each other to form a structure for isolating water vapor, to provide a carrying function and a water vapor blocking function for the display panel.

In an embodiment, the multi-layer protective structure further includes a fourth protective layer, the fourth protective layer is located between the third protective layer and the shielding layer, the fourth protective layer is made of an insulating material, and the fourth protective layer is used to cooperate with the first protective layer, the second protective layer, and the third protective layer to form a structure for isolating water vapor, to provide a carrying function and a water vapor blocking function for the display panel.

According to a second aspect, this application provides a terminal device including a first body and a second body that are rotatably connected, the display apparatus according to the first aspect, a first mainboard, and a second mainboard. A first screen area of a display panel of the display apparatus corresponds to the first body, and a second screen area of the display panel corresponds to the second body. The first mainboard is disposed inside the first body and is electrically connected to a second end of the first connecting piece, and the second mainboard is disposed inside the second body and is electrically connected to a second end of the second connecting piece. The first connecting piece, the metal wire, and the second connecting piece are used to implement an electrical connection between the first mainboard and the second mainboard and transmit at least a part of signals exchanged between the first mainboard and the second mainboard.

The terminal device provided in this embodiment integrates a mainboard connection structure at a back side of a flexible display panel of the display apparatus, implements, by using a wiring layer included in the mainboard connection structure, an interconnection between two mainboards located on two foldable bodies of the terminal device, and ensures, by using a shielding layer included in the mainboard connection structure, that a signal transmitted by the wiring layer does not affect normal operation of a circuit structure of the display panel. In this way, when the terminal device transmits, by using the wiring layer included in the mainboard connection structure, all signals exchanged between the two mainboards, all lines of a through-going shaft connecting piece may be transferred to the back side of the display panel without using the through-going shaft connecting piece, so that bending performance of the terminal device can be improved, and there is no reliability problem that the through-going shaft connecting piece is damaged after being bent. Therefore, reliability of the interconnection between the two mainboards can be ensured, and further an overall thickness of the terminal device can be reduced, thereby facilitating a thinning design of the terminal device. When the terminal device reserves the through-going shaft connecting piece and transmits, by using the wiring layer included in the mainboard connection structure, some signals exchanged between the two mainboards, some lines of the through-going shaft connecting piece may be transferred to the back side of the display panel, to reduce a thickness of the through-going shaft connecting piece, so that the terminal device has a smaller bending radius, bending performance is improved, reliability problems are reduced, and further an overall thickness of the terminal device is reduced, to implement the thinning design of the terminal device.

In an embodiment, the terminal device further includes a rotary connection structure connected between the first body and the second body, and the rotary connection structure is used to implement a rotary connection between the first body and the second body, so that the first body and the second body are capable of being folded and unfolded relative to each other.

In an embodiment, the terminal device further includes a through-going shaft connecting piece, both ends of the through-going shaft connecting piece are respectively electrically connected to the first mainboard and the second mainboard, and the through-going shaft connecting piece is used to implement an electrical connection between the first mainboard and the second mainboard and transmit a first part of signals exchanged between the first mainboard and the second mainboard. The through-going shaft connecting piece is a flexible circuit board, and a middle part of the through-going shaft connecting piece is located at a position close to the rotary connection structure, and is bent or unfolded along with rotation of the rotary connection structure. The mainboard connection structure is used to transmit a second part of signals exchanged between the first mainboard and the second mainboard. The first part of signals and the second part of signals are different signals.

In an embodiment, a mounting channel is disposed in the rotary connection structure, and the middle part of the through-going shaft connecting piece is located in the mounting channel on the rotary connection structure.

The terminal device provided in this embodiment reserves the through-going shaft connecting piece and transmits, by using the wiring layer included in the mainboard connection structure, some signals exchanged between the two mainboards. In this way, some lines of the through-going shaft connecting piece may be transferred to the back side of the display panel, to reduce a thickness of the through-going shaft connecting piece, so that the terminal device has a smaller bending radius, bending performance is improved, reliability problems are reduced, and further an overall thickness of the terminal device is reduced, to implement the thinning design of the terminal device.

According to a third aspect, this application provides a manufacturing method for a foldable display apparatus, used for manufacturing the display apparatus according to the first aspect. The manufacturing method includes:
  forming a first protective layer on a carrier;
  forming a wiring layer at the first protective layer, where the wiring layer includes a metal wire; a position of a first end of the metal wire corresponds to a first screen area of the display panel, and is formed with a first bonding pad; and a position of a second end of the metal wire corresponds to a second screen area of the display panel, and is formed with a second bonding pad;
  forming, at the wiring layer, an insulation layer that entirely covers the wiring layer;
  forming, at the insulation layer, a shielding layer that entirely covers the wiring layer;
  removing the carrier;
  opening a window at a position that is at the first protective layer and that is corresponding to the first bonding pad of the metal wire, to form a first pad area, so that the first bonding pad of the metal wire is exposed in the first pad area; opening a window at a position that is at the first protective layer and that is corresponding to the second bonding pad of the metal wire, to form a second pad area, so that the second bonding pad of the metal wire is exposed in the second pad area; welding a first end of a first connecting piece to the first pad area, so that the first end of the first connecting piece is electrically connected to the first bonding pad of the metal wire; and welding a first end of a second connecting piece to the second pad area, so that the first end of the second connecting piece is electrically connected to the second bonding pad of the metal wire.

In the manufacturing method for a foldable display apparatus provided in this embodiment, a mainboard connection structure is integrated into a multi-layer protective structure at a back side of a display panel by using a semiconductor process. In this way, when the terminal device transmits, by using a wiring layer included in the mainboard connection structure, all signals exchanged between a first mainboard and a second mainboard, all lines of a through-going shaft connecting piece may be transferred to the back side of the display panel without using the through-going shaft connecting piece, so that bending performance of the terminal device can be improved, and there is no reliability problem that the through-going shaft connecting piece is damaged after being bent. Therefore, reliability of the interconnection between the two mainboards can be ensured, and further an overall thickness of the terminal device can be reduced, thereby facilitating a thinning design of the terminal device.

When the terminal device reserves the through-going shaft connecting piece and transmits, by using the wiring layer included in the mainboard connection structure, some signals exchanged between the first mainboard and the second mainboard, some lines of the through-going shaft connecting piece may be transferred to the back side of the display panel, to reduce a thickness of the through-going shaft connecting piece, so that the terminal device has a smaller bending radius, bending performance is improved, reliability problems are reduced, and further an overall thickness of the terminal device is reduced, to implement the thinning design of the terminal device.

In an embodiment, the wiring layer includes a plurality of metal wires that are not connected to each other.

In an embodiment, the step of forming a wiring layer at the first protective layer includes:

disposing a plurality of grooves on a surface that is of the first protective layer and that is away from the carrier, and forming the plurality of metal wires of the wiring layer in the plurality of grooves, or forming the plurality of metal wires of the wiring layer in the plurality of grooves and on the surface that is of the first protective layer and that is away from the carrier.

In an embodiment, the plurality of grooves are the same in depth, or a depth of at least one of the plurality of grooves is greater than a depth of another groove in the plurality of grooves.

Optionally, the plurality of grooves are the same in width, or a width of at least one of the plurality of grooves is greater than a width of another groove in the plurality of grooves.

It may be understood that, based on the foregoing various embodiments, the various embodiments are combined into different combinations, to adjust positions of the plurality of metal wires (for example, all the plurality of metal wires are formed in the grooves, or are formed on the surface of the first protective layer and in the plurality of grooves), and to adjust depths and/or widths of the grooves and the like, so that a plurality of metal wires at a same wiring layer can have a same depth and a same width or different depths and different widths. In this way, the plurality of metal wires at the same wiring layer have a same through-current capability or different through-current capabilities, and can transmit signals of a same type or different types.

In an embodiment, the plurality of metal wires have similar wiring patterns, so that uniform wiring of the wiring layer can be facilitated. Alternatively, a wiring pattern of at least one of the plurality of metal wires is different from a wiring pattern of another metal wire in the plurality of metal wires. In this way, corresponding wiring can be flexibly performed at a wiring stage based on an impedance requirement, for wiring, of a signal transmitted by each metal wire.

Optionally, the plurality of metal wires are the same in width, or a width of at least one of the plurality of metal wires is greater than a width of another metal wire in the plurality of metal wires. It may be understood that when a width of the wire is increased, direct-current impedance of the wire can be reduced, and a through-current capability of the wire can be improved, so that metal wires with different through-current capabilities can be laid out at a same layer. For example, a through-current capability of a metal wire corresponding to a power supply signal is greater than a through-current capability of a metal wire corresponding to a common signal. Therefore, a width of the metal wire corresponding to the power supply signal needs to be greater than a width of the metal wire corresponding to the common signal.

Optionally, the plurality of metal wires are the same in thickness, or a thickness of at least one of the plurality of metal wires is greater than a thickness of another metal wire in the plurality of metal wires. It may be understood that when a thickness of the wire is increased, direct-current impedance of the wire can be reduced, and a through-current capability of the wire can be improved, so that metal wires with different through-current capabilities can be laid out at a same layer. For example, a thickness of the metal wire corresponding to the power supply signal needs to be greater than a thickness of the metal wire corresponding to the common signal.

In an embodiment, the first connecting piece includes a plurality of first transmission lines and a plurality of third bonding pads disposed at the first end of the first connecting piece, the plurality of third bonding pads are electrically connected to the plurality of first transmission lines in a one-to-one manner, and the plurality of third bonding pads are further electrically connected in a one-to-one manner to first bonding pads that are of the plurality of metal wires and that are exposed in the first pad area; and the second connecting piece includes a plurality of second transmission lines and a plurality of fourth bonding pads disposed at the first end of the second connecting piece, the plurality of fourth bonding pads are electrically connected to the plurality of second transmission lines in a one-to-one manner, and the plurality of fourth bonding pads are further electrically connected in a one-to-one manner to second bonding pads that are of the plurality of metal wires and that are exposed in the second pad area.

The manufacturing method further includes: separately disposing conductors in the first pad area and the second pad area. A conductor disposed in the first pad area is used to implement one-to-one electrical connections between the first bonding pads of the plurality of metal wires and the plurality of third bonding pads included in the first connecting piece, and a conductor disposed in the second pad area is used to implement one-to-one electrical connections between the second bonding pads of the plurality of metal wires and the plurality of fourth bonding pads included in the second connecting piece.

In an embodiment, the conductors are anisotropic conductive films, and the conductors are separately filled in the first pad area and the second pad area. In this way, the conductor provides a conductive channel in a thickness direction of the display apparatus, and is insulated in a direction perpendicular to the thickness direction of the display apparatus. Therefore, the conductor filled in the first pad area can implement one-to-one electrical connections between the first bonding pads of the plurality of metal wires and the plurality of third bonding pads at the first end of the first connecting piece, can effectively avoid a short circuit between the plurality of metal wires, and can also avoid a short circuit between the plurality of first transmission lines included in the first connecting piece; and the conductor filled in the second pad area can implement one-to-one electrical connections between the second bonding pads of the plurality of metal wires and the plurality of fourth bonding pads at the first end of the second connecting piece, can effectively avoid a short circuit between the plurality of metal wires, and can also avoid a short circuit between the plurality of second transmission lines included in the second connecting piece.

Optionally, the conductors are brazing filler metals, and the conductors are separately coated on each first bonding pad and each second bonding pad of the plurality of metal wires.

In this way, through the conductor in the first pad area, signals on the plurality of third bonding pads at the first end of the first connecting piece can be longitudinally conducted to first bonding pads of corresponding metal wires and then input into the corresponding metal wires, or signals on the first bonding pads of the plurality of metal wires can be longitudinally conducted to corresponding third bonding pads of the first connecting piece and then input into corresponding first transmission lines. Through the conductor in the second pad area, signals on the second bonding pads of the plurality of metal wires can be longitudinally conducted to corresponding fourth bonding pads of the second connecting piece and then input into corresponding second transmission lines, or signals on the plurality of fourth bonding pads at the first end of the second connecting piece can be longitudinally conducted to second bonding pads of corresponding metal wires and then input into the corresponding metal wires.

In an embodiment, before the removing the carrier, the manufacturing method further includes:
forming a third protective layer at the shielding layer, where the third protective layer is made of a waterproof material; and forming a second protective layer at the third protective layer, where both the first protective layer and the second protective layer are made of an insulating material, and the first protective layer, the second protective layer, and the third protective layer are used to cooperate with each other to form a structure for isolating water vapor.

In an embodiment, the manufacturing method further includes:
forming a TFT layer at the second protective layer; and forming an OLED layer at the TFT layer.

In an embodiment, the manufacturing method further includes:
forming a touch layer at the OLED layer.

In this embodiment, the display apparatus obtained by using the manufacturing method is a display screen with a touch function. In another embodiment, the display apparatus is a display screen with no touch function, and correspondingly, the touch layer may be omitted.

According to a fourth aspect, this application provides a manufacturing method for a foldable display apparatus, used for manufacturing the display apparatus according to the first aspect. The manufacturing method includes:
providing a display panel and a partial structure of a multi-layer protective structure, where the display panel is carried on the multi-layer protective structure;
forming a shielding layer on a surface that is of the multi-layer protective structure and that is away from the display panel;
forming an insulation layer at the shielding layer;
forming a wiring layer at the insulation layer, where the wiring layer includes a metal wire; a position of a first end of the metal wire corresponds to a first screen area of the display panel, and is formed with a first bonding pad; a position of a second end of the metal wire corresponds to a second screen area of the display panel, and is formed with a second bonding pad; and the shielding layer entirely covers the wiring layer;
forming a first protective layer of the multi-layer protective structure at the wiring layer;

opening a window at a position that is at the first protective layer and that is corresponding to the first bonding pad of the metal wire, to form a first pad area, so that the first bonding pad of the metal wire is exposed in the first pad area; opening a window at a position that is at the first protective layer and that is corresponding to the second bonding pad of the metal wire, to form a second pad area, so that the second bonding pad of the metal wire is exposed in the second pad area; welding a first end of a first connecting piece to the first pad area, so that the first end of the first connecting piece is electrically connected to the first bonding pad of the metal wire; and welding a first end of a second connecting piece to the second pad area, so that the first end of the second connecting piece is electrically connected to the second bonding pad of the metal wire.

In the manufacturing method for a foldable display apparatus provided in this embodiment, a mainboard connection structure is integrated into a multi-layer protective structure at a back side of the display panel by using a semiconductor process. In this way, when a terminal device transmits, by using a wiring layer included in the mainboard connection structure, all signals exchanged between a first mainboard and a second mainboard, all lines of a through-going shaft connecting piece may be transferred to the back side of the display panel without using the through-going shaft connecting piece, so that bending performance of the terminal device can be improved, and there is no reliability problem that the through-going shaft connecting piece is damaged after being bent. Therefore, reliability of an interconnection between the two mainboards can be ensured, and further an overall thickness of the terminal device can be reduced, thereby facilitating a thinning design of the terminal device.

When the terminal device reserves the through-going shaft connecting piece and transmits, by using the wiring layer included in the mainboard connection structure, some signals exchanged between the first mainboard and the second mainboard, some lines of the through-going shaft connecting piece may be transferred to the back side of the display panel, to reduce a thickness of the through-going shaft connecting piece, so that the terminal device has a smaller bending radius, bending performance is improved, reliability problems are reduced, and further an overall thickness of the terminal device is reduced, to implement the thinning design of the terminal device.

In an embodiment, the wiring layer includes a plurality of metal wires that are not connected to each other.

In an embodiment, the step of forming a wiring layer at the insulation layer includes:
disposing a plurality of grooves on a surface that is of the insulation layer and that is away from the shielding layer; and
forming the plurality of metal wires of the wiring layer in the plurality of grooves, or forming the plurality of metal wires of the wiring layer in the plurality of groove and on the surface that is of the insulation layer and that is away from the shielding layer.

In an embodiment, the plurality of grooves are the same in depth, or a depth of at least one of the plurality of grooves is greater than a depth of another groove in the plurality of grooves.

Optionally, the plurality of grooves are the same in width, or a width of at least one of the plurality of grooves is greater than a width of another groove in the plurality of grooves.

It may be understood that, based on the foregoing various embodiments, the various embodiments are combined into different combinations, to adjust positions of the plurality of metal wires (for example, all the plurality of metal wires are formed in the grooves, or are formed on the surface of the first protective layer and in the plurality of grooves), and to adjust depths and/or widths of the grooves and the like, so that a plurality of metal wires at a same wiring layer can have a same depth and a same width or different depths and different widths. In this way, the plurality of metal wires at the same wiring layer have a same through-current capability or different through-current capabilities, and can transmit signals of a same type or different types.

In an embodiment, the plurality of metal wires have similar wiring patterns, so that uniform wiring of the wiring layer can be facilitated. Alternatively, a wiring pattern of at least one of the plurality of metal wires is different from a wiring pattern of another metal wire in the plurality of metal wires. In this way, corresponding wiring can be flexibly performed at a wiring stage based on an impedance requirement, for wiring, of a signal transmitted by each metal wire.

Optionally, the plurality of metal wires are the same in width, or a width of at least one of the plurality of metal wires is greater than a width of another metal wire in the plurality of metal wires. It may be understood that when a width of the wire is increased, direct-current impedance of the wire can be reduced, and a through-current capability of the wire can be improved, so that metal wires with different through-current capabilities can be laid out at a same layer. For example, a through-current capability of a metal wire corresponding to a power supply signal is greater than a through-current capability of a metal wire corresponding to a common signal. Therefore, a width of the metal wire corresponding to the power supply signal needs to be greater than a width of the metal wire corresponding to the common signal.

Optionally, the plurality of metal wires are the same in thickness, or a thickness of at least one of the plurality of metal wires is greater than a thickness of another metal wire in the plurality of metal wires. It may be understood that when a thickness of the wire is increased, direct-current impedance of the wire can be reduced, and a through-current capability of the wire can be improved, so that metal wires with different through-current capabilities can be laid out at a same layer. For example, a thickness of the metal wire corresponding to the power supply signal needs to be greater than a thickness of the metal wire corresponding to the common signal.

In an embodiment, the first connecting piece includes a plurality of first transmission lines and a plurality of third bonding pads disposed at the first end of the first connecting piece, the plurality of third bonding pads are electrically connected to the plurality of first transmission lines in a one-to-one manner, and the plurality of third bonding pads are further electrically connected in a one-to-one manner to first bonding pads that are of the plurality of metal wires and that are exposed in the first pad area; and the second connecting piece includes a plurality of second transmission lines and a plurality of fourth bonding pads disposed at the first end of the second connecting piece, the plurality of fourth bonding pads are electrically connected to the plurality of second transmission lines in a one-to-one manner, and the plurality of fourth bonding pads are further electrically connected in a one-to-one manner to second bonding pads that are of the plurality of metal wires and that are exposed in the second pad area.

The manufacturing method further includes: separately disposing conductors in the first pad area and the second pad area, where a conductor disposed in the first pad area is used to implement one-to-one electrical connections between the first bonding pads of the plurality of metal wires and the plurality of third bonding pads included in the first connecting piece, and a conductor disposed in the second pad area is used to implement one-to-one electrical connections between the second bonding pads of the plurality of metal wires and the plurality of fourth bonding pads included in the second connecting piece.

In an embodiment, the conductors are anisotropic conductive films, and the conductors are separately filled in the first pad area and the second pad area. In this way, the conductor provides a conductive channel in a thickness direction of the display apparatus, and is insulated in a direction perpendicular to the thickness direction of the display apparatus. Therefore, the conductor filled in the first pad area can implement one-to-one electrical connections between the first bonding pads of the plurality of metal wires and the plurality of third bonding pads at the first end of the first connecting piece, can effectively avoid a short circuit between the plurality of metal wires, and can also avoid a short circuit between the plurality of first transmission lines included in the first connecting piece; and the conductor filled in the second pad area can implement one-to-one electrical connections between the second bonding pads of the plurality of metal wires and the plurality of fourth bonding pads at the first end of the second connecting piece, can effectively avoid a short circuit between the plurality of metal wires, and can also avoid a short circuit between the plurality of second transmission lines included in the second connecting piece.

Optionally, the conductors are brazing filler metals, and the conductors are separately coated on each first bonding pad and each second bonding pad of the plurality of metal wires.

In this way, through the conductor in the first pad area, signals on the plurality of third bonding pads at the first end of the first connecting piece can be longitudinally conducted to first bonding pads of corresponding metal wires and then input into the corresponding metal wires, or signals on the first bonding pads of the plurality of metal wires can be longitudinally conducted to corresponding third bonding pads of the first connecting piece and then input into corresponding first transmission lines. Through the conductor in the second pad area, signals on the second bonding pads of the plurality of metal wires can be longitudinally conducted to corresponding fourth bonding pads of the second connecting piece and then input into corresponding second transmission lines, or signals on the plurality of fourth bonding pads at the first end of the second connecting piece can be longitudinally conducted to second bonding pads of corresponding metal wires and then input into the corresponding metal wires.

BRIEF DESCRIPTION OF DRAWINGS

To describe technical solutions in embodiments of this application more clearly, the following briefly describes accompanying drawings that need to be used in embodiments of this application. It is clear that the accompanying drawings in the following descriptions show merely some embodiments of this application, and a person of ordinary skill in the art may still derive other accompanying drawings from these accompanying drawings without creative efforts.

FIG. 13a is a planar schematic diagram of a groove formed at a first protective layer shown in FIG. 12a;

FIG. 14a is another planar schematic diagram of a groove formed at a first protective layer shown in FIG. 12a;

FIG. 15A and FIG. 15B are a flowchart of a manufacturing method for a foldable display apparatus according to a second embodiment of this application;

DESCRIPTION OF REFERENCE SIGNS OF MAIN ELEMENTS

Figure 1:
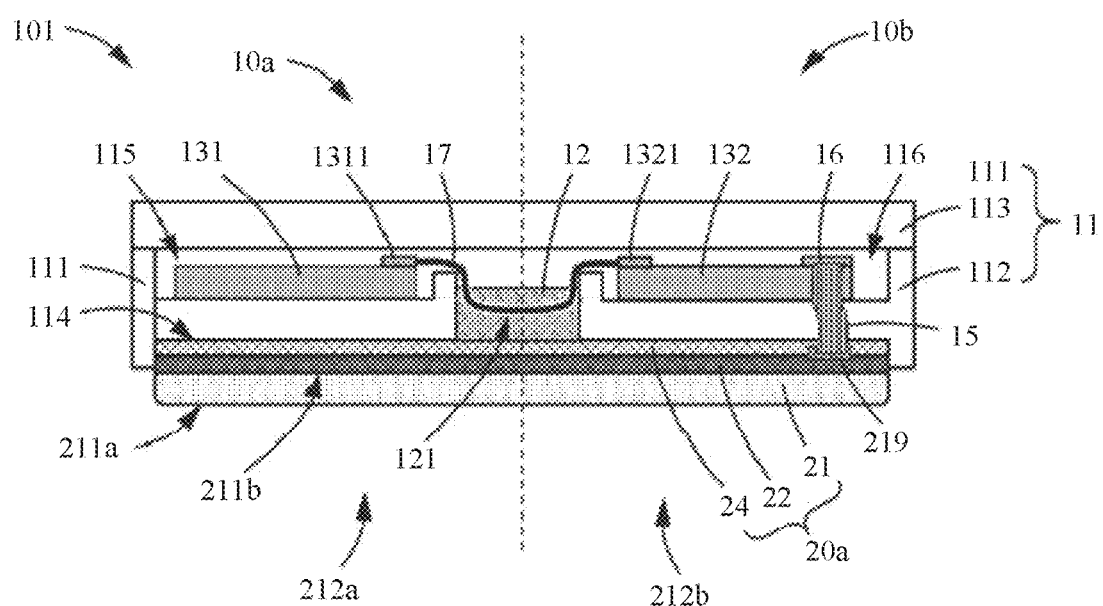
FIG. 1 is a perspective view of a side structure of a first type of terminal device after a partial structure is removed according to an embodiment of this application.

| Description of reference signs of main elements | |
|---|---|
| Terminal device | 101, 102, 103 |
| First body | 10a |
| Second body | 10b |
| Housing assembly | 11 |
| First middle frame | 111 |
| Second middle frame | 112 |
| Rear cover | 113 |
| First mounting groove | 114 |
| Second mounting groove | 115 |
| Third mounting groove | 116 |
| Rotary connection structure | 12 |
| Mounting channel | 121 |
| Circuit board assembly | 13 |
| First mainboard | 131 |
| Second connection unit | 1311 |
| Fourth connection unit | 1312 |
| Second mainboard | 132 |
| Third connection unit | 1321 |
| Fifth connection unit | 1322 |
| First secondary board | 133 |
| Second secondary board | 134 |
| Energy storage assembly | 14 |
| First energy storage unit | 141 |
| Second energy storage unit | 142 |
| FPC | 15 |
| First connection unit | 16 |
| Through-going shaft connecting piece | 17 |
| Display apparatus | 20a, 20b |
| Display panel | 21 |
| Display surface | 211a |
| Non-display surface | 211b |
| First screen area | 212a |
| Second screen area | 212b |
| Bonding area | 212c |
| TFT layer | 213 |
| OLED layer | 214 |
| Touch layer | 215 |
| Polarizer | 216 |
| Cover film | 217 |
| Drive chip | 218 |
| Bonding pad | 219 |
| Protective structure | 22 |
| First protective layer | 22 |
| First pad area | 221a |
| Second pad area | 221b |
| Groove | 221c |
| Second protective layer | 222 |

-continued

| Description of reference signs of main elements | |
| --- | --- |
| Third protective layer | 223 |
| Fourth protective layer | 224 |
| Mainboard connection structure | 23 |
| Wiring layer | 231 |
| Metal wire | 2311 |
| First bonding pad | 2311a |
| Second bonding pad | 2311b |
| Insulation layer | 232 |
| Shielding layer | 233 |
| Conductor | 234, 235 |
| First connecting piece | 236 |
| Board-to-board connector | 2361 |
| Second connecting piece | 237 |
| Board-to-board connector | 2371 |
| Supporting structure | 24 |
| Carrier | 300 |

This application is further described in the following specific implementations with reference to the accompanying drawings.

DESCRIPTION OF EMBODIMENTS

The following clearly and completely describes technical solutions in embodiments of this application with reference to the accompanying drawings in the embodiments of this application. The accompanying drawings are for illustrative descriptions only, and are merely schematic drawings, and cannot be construed as limitation on this application. It is clear that the described embodiments are merely some but not all of embodiments of this application. Based on the embodiments of this application, all other embodiments obtained by a person of ordinary skill in the art without creative efforts fall within the protection scope of this application.

Unless otherwise defined, meanings of all technical and scientific terms used in this application are the same as meanings usually understood by a person skilled in the art. Terms used in the specification of this application are merely intended to describe specific embodiments but not intended to limit this application.

A foldable terminal device includes two foldable bodies, and implements relative folding and relative unfolding of two bodies on both sides of a rotating shaft structure by using a structure such as a rotating shaft. The two bodies are folded, so that miniaturization of the terminal device can be implemented, and a use requirement for being easy to be carried by a user can be met. The two bodies are unfolded, so that display screens on the two bodies can form a continuous large-area display surface, and a function of display on a large screen can be implemented, to meet a use requirement of the user for display on a large screen.

In the foldable terminal device, generally, mainboards are further configured on the two bodies, and the two mainboards usually need to be electrically connected, to implement an electrical connection between electronic components on the two bodies, and meet a design requirement of a function such as control over the terminal device. Because the two mainboards are located on different bodies, and two foldable bodies can be folded and unfolded relative to each other, how to dispose a connection structure between the two mainboards to ensure reliability of a connection between the two mainboards without increasing an overall thickness of the terminal device becomes an important part to be considered at a structural design stage of the foldable terminal device.

Figure 2:
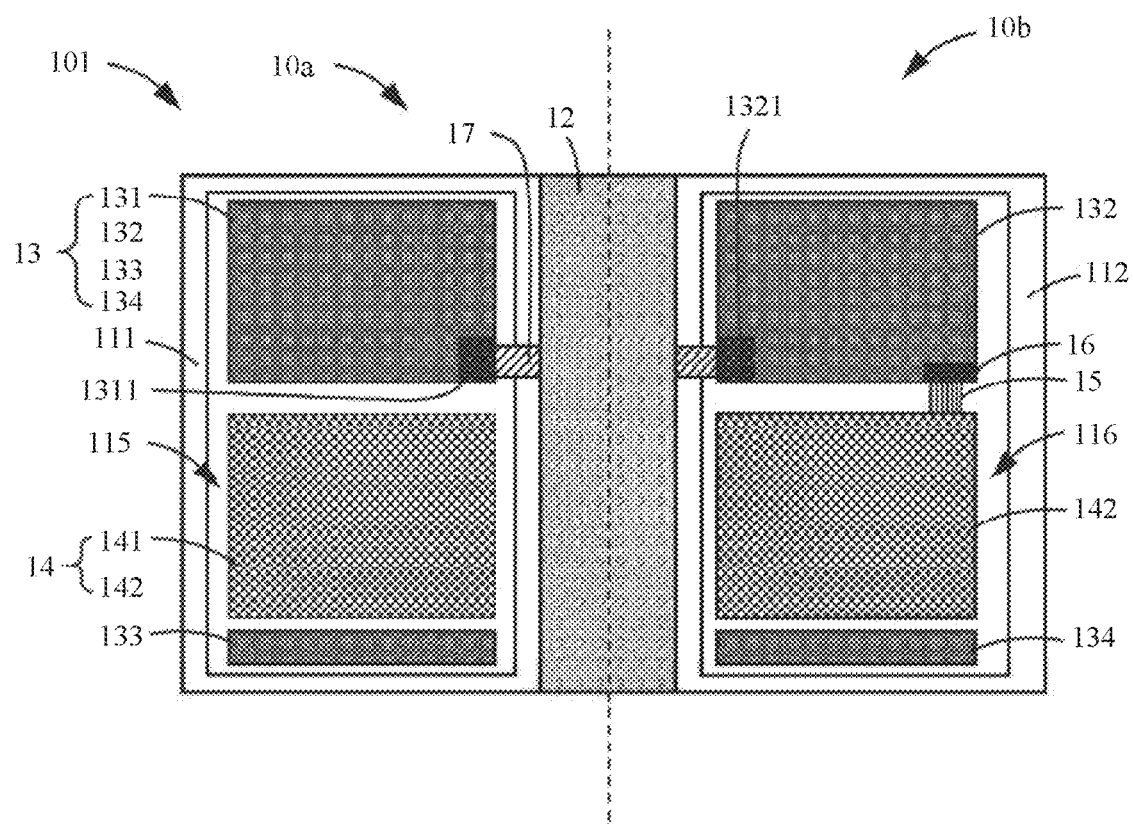
FIG. 2 is a schematic diagram of a planar structure of a back side of a first type of terminal device after a partial structure is removed according to an embodiment of this application.

Refer to both FIG. 1 and FIG. 2. An embodiment of this application provides a first type of terminal device 101. FIG. 1 is a perspective view of a side structure of the terminal device 101 after a partial structure is removed, for example, a structure such as a first secondary board 133, a second secondary board 134, or an energy storage assembly 14 shown in FIG. 2. FIG. 2 is a schematic diagram of a planar structure of a back side (a non-display surface) of the terminal device 101 after a partial structure is removed, for example, a structure such as a rear cover 113 shown in FIG. 1. The terminal device 101 includes but is not limited to an electronic device such as a mobile phone, a tablet computer, or a smartwatch. In this embodiment, a mobile phone is used as an example of the terminal device 101 to describe the technical solutions of this application.

As shown in FIG. 1 and FIG. 2, the terminal device 101 includes a first body 10a and a second body 10b that are rotatably connected. In other words, the terminal device 101 is a foldable electronic device, and the first body 10a and the second body 10b can be folded and unfolded relative to each other. Specifically, the terminal device 101 includes a housing assembly 11, a rotary connection structure 12, and a foldable display apparatus 20a. The housing assembly 11 is used to mount and protect other electronic components included in the terminal device 101. The housing assembly 11 includes a first middle frame 111, a second middle frame 112, and a rear cover 113. The rotary connection structure 12 is connected between the first middle frame 111 and the second middle frame 112. The rotary connection structure 12 is used to implement a rotary connection between the first middle frame 111 and the second middle frame 112, so that the first middle frame 111 and the second middle frame 112 can be folded and unfolded relative to each other. The rotary connection structure 12 may be a rotating shaft, a hinge structure, or the like, and a specific structure of the rotary connection structure 12 is not specifically limited in this application.

An entirety including the first middle frame 111, the rotary connection structure 12, and the second middle frame 112 is located between the rear cover 113 and the display apparatus 20a. Specifically, a first mounting groove 114 is formed on one side of the entirety including the first middle frame 111, the rotary connection structure 12, and the second middle frame 112, and the display apparatus 20a is fixedly mounted in the first mounting groove 114, that is, the display apparatus 20a is located on a same side of the first middle frame 111, the rotary connection structure 12, and the second middle frame 112. The first middle frame 111, the rotary connection structure 12, and the second middle frame 112 are used to fasten and carry the display apparatus 20a. It may be understood that the first mounting groove 114 is formed on one side of the entirety including the first middle frame 111, the rotary connection structure 12, and the second middle frame 112, to mount the display apparatus 20a, so that reliability of mounting the display apparatus 20a can be ensured, and further an overall thickness of the terminal device 101 can be reduced.

In this embodiment, the foldable display apparatus 20a includes a flexible display panel 21. The display panel 21 includes a display surface 211a and a non-display surface 211b that are back to back, a first screen area 212a corresponding to the first body 10a, and a second screen area 212b corresponding to the second body 10b. When the display panel 21 is in a folded state, the first screen area 212a and the second screen area 212b at least partially overlap. In this application, the first screen area 212a and the second screen area 212b are approximately equal in area; in other words, that the first screen area 212a and the second screen area 212b entirely overlap after the display panel 21 is folded is used as an example to describe the technical solutions of this application.

In this embodiment, the first screen area 212a and the second screen area 212b that are included in the display panel 21 and that can be folded relative to each other are two areas that are continuously distributed on a same side of the first middle frame 111, the rotary connection structure 12, and the second middle frame 112. When the first body 10a and the second body 10b are unfolded relative to each other, the first screen area 212a and the second screen area 212b of the display panel 21 may form a continuous large-area display surface. When the first body 10a and the second body 10b are folded relative to each other, the first screen area 212a and the second screen area 212b of the display panel 21 may be bent to form two display surfaces, and both the two display surfaces may be exposed on an outer side of the terminal device 101 or may be hidden on an inner side of the terminal device 101.

Figure 3:
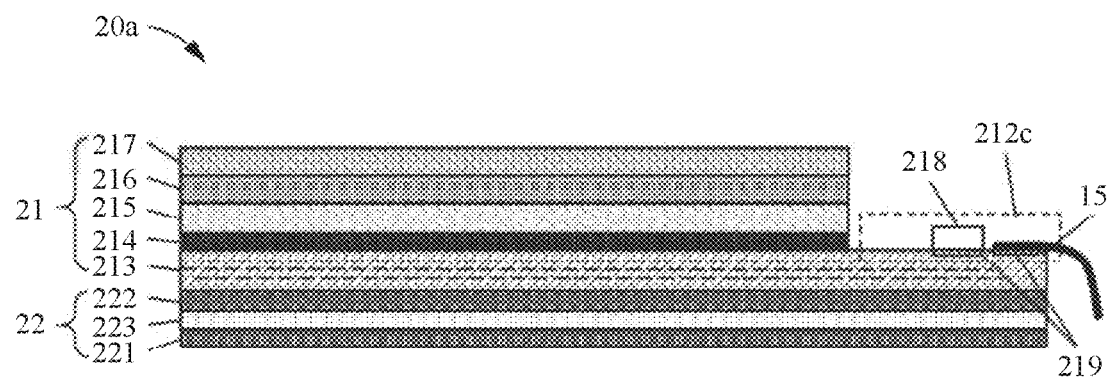
FIG. 3 is a schematic diagram of a stacked structure of a foldable display apparatus of the first type of terminal device shown in FIG. 1.

As shown in FIG. 3, the display panel 21 includes a multi-layer stacked structure, for example, includes a thin film transistor (Thin Film Transistor, TFT) layer 213, a flexible organic light emitting diode (Flexible organic light emitting diode, OLED) layer 214, a touch layer (touch panel) 215, a polarizer (Polarizer, POL) 216, a cover film (Cover Film) 217, and the like that are stacked in sequence.

In this embodiment, the display apparatus 20a further includes a multi-layer protective structure 22. The multi-layer protective structure 22 is used to provide functions such as water vapor blocking and carrying for the display panel 21. Specifically, the multi-layer protective structure 22 includes a first protective layer 221, a second protective layer 222, and a third protective layer 223 that are stacked and that entirely cover the non-display surface 211b of the display panel 21. The first protective layer 221 is away from the display panel 21, and the second protective layer 222 is adjacent to the display panel 21, for example, the second protective layer 222 is disposed on a surface that is of the TFT layer 213 of the display panel 21 and that is away from the OLED layer 214. The third protective layer 223 is located between the first protective layer 221 and the second protective layer 222. Both the first protective layer 221 and the second protective layer 222 are made of an insulating material, and materials of the first protective layer 221 and the second protective layer 222 may be the same, for example, may be polyimide (Polyimide, PI). The third protective layer 223 may be made of a waterproof material such as SiNx, SiON, or SiOx. The first protective layer 221, the second protective layer 222, and the third protective layer 223 are used to cooperate with each other to form a structure for isolating water vapor, to provide a carrying function and a water vapor blocking function for the display panel 21.

Refer to FIG. 1 again. The display apparatus 20a further includes a supporting structure 24. The supporting structure 24 is located on a side that is of the multi-layer protective structure 22 and that is away from the display panel 21, and the supporting structure 24 is located at the bottom of the first mounting groove 114 after the display apparatus 20a is mounted on the housing assembly 11. The supporting structure 24 may include one or more layers of structures, and may be made of copper foil, foam, or the like. The supporting structure 24 is used to provide support, heat dissipation, shielding from external signal interference, anti-vibration, or the like for the display panel 21.

Refer to FIG. 1-FIG. 3 together. In this embodiment, the display panel 21 further includes a bonding area (Bonding Area) 212c disposed in an edge area of the non-display surface 211b. The bonding area 212c is also referred to as a pad area (Pad Area). At least one drive chip 218 and at least two bonding pads (Bonding Pad) 219 are disposed in the bonding area 212c. The drive chip 218 is bonded in the bonding area 212c by using the bonding pad 219, and is electrically connected to a drive circuit (not shown in the figure, for example, a data line or a gate line) of the display panel 21 by using the corresponding bonding pad 219. For example, the drive chip 218 may include a time sequence control chip, a source control chip, and a gate control chip. The source control chip and the gate control chip are separately bonded in the bonding area 212c by using the bonding pad 219, and are electrically connected to the drive circuit of the display panel 21 by using the corresponding bonding pad 219, and the time sequence control chip is bonded in the bonding area 212c by using the bonding pad 219, and is separately electrically connected to the source control chip and the gate control chip by using the corresponding bonding pad 219.

The terminal device 101 further includes a circuit board assembly 13 and a flexible printed circuit board (Flexible Printed Circuit, FPC) 15. The circuit board assembly 13 includes a first mainboard 131 and a second mainboard 132. A first connection unit 16 is disposed on the first mainboard 131 and/or the second mainboard 132. One end of the FPC 15 is electrically connected to the first connection unit 16, and the other end is bonded in the bonding area 212c by using the bonding pad 219, and is electrically connected to the drive chip 218 such as the time sequence control chip by using the corresponding bonding pad 219, to implement an electrical connection between the display panel 21 and the first mainboard 131 and/or the second mainboard 132, and to further implement drive control of the first mainboard 131 and/or the second mainboard 132 over the display panel 21. For example, the first mainboard 131 and/or the second mainboard 132 may transmit a drive control signal to the time sequence control chip by using the FPC 15, and then the time sequence control chip responds to the drive control signal, transmits a corresponding scanning signal to the gate control chip, and transmits a corresponding data signal to the source control chip, to implement drive control over the display panel 21. In this application, that the first connection unit 16 is disposed on the second mainboard 132 is used as an example to describe the technical solutions of this application.

In an embodiment, the first connection unit 16 may be a board-to-board connector, and correspondingly, the board-to-board connector (not shown in the figure) electrically connected to the first connection unit 16 may be disposed at one end of the FPC 15, to facilitate assembly of and an electrical connection between the FPC 15 and the first connection unit 16, and to facilitate maintenance or replacement of any one of the following components: the FPC 15, the display panel 21, and a mainboard (for example, the second mainboard 132) in which the first connection unit 16 is located.

In this embodiment, a second mounting groove 115 is formed, through sinking, on a surface that is of the first middle frame 111 and that is away from the first mounting groove 114, and a third mounting groove 116 is formed, through sinking, on a surface that is of the second middle frame 112 and that is away from the first mounting groove 114. A side that is of the first middle frame 111 and that is away from the first mounting groove 114 and a side that is of the second middle frame 112 and that is away from the first mounting groove 114 are further separately fixedly connected to the rear cover 113, so that an accommodating cavity is formed in the second mounting groove 115 between the rear cover 113 and the first middle frame 111, and an accommodating cavity is formed in the third mounting groove 116 between the rear cover 113 and the second middle frame 112.

In this embodiment, the rear cover 113 separately covers the second mounting groove 115 on the first middle frame 111, the third mounting groove 116 on the second middle frame 112, and a surface that is of the rotary connection structure 12 and that is away from the display apparatus 20a. In another embodiment, the rear cover 113 may alternatively include two cover bodies, one cover body covers the second mounting groove 115 on the first middle frame 111, the other cover body covers the third mounting groove 116 on the second middle frame 112, and the surface that is of the rotary connection structure 12 and that is away from the display apparatus 20a is exposed on an outer side of the terminal device 101.

The terminal device 101 further includes an energy storage assembly 14. In this embodiment, the energy storage assembly 14 includes a first energy storage unit 141 and a second energy storage unit 142. The first mainboard 131 and the first energy storage unit 141 are separately fastened in the second mounting groove 115 on the first middle frame 111, and the second mainboard 132 and the second energy storage unit 142 are separately fastened in the third mounting groove 116 on the second middle frame 112. In this way, the first middle frame 111 and the second middle frame 112 may be considered as a "skeleton" of the terminal device 101 that is used to carry and fasten other structural components of the terminal device 101, for example, the first mainboard 131, the second mainboard 132, the first energy storage unit 141, and the second energy storage unit 142. The first energy storage unit 141 and the second energy storage unit 142 may be energy storage components such as lithium batteries.

The first mainboard 131 is configured to mount an electronic component on the first body 10a, for example, a component such as an antenna structure, a processor, a memory, a multimedia component, or a power key, and an accessory circuit structure thereof. The second mainboard 132 is configured to mount an electronic component on the second body 10b, for example, a component such as an antenna structure, a processor, a memory, a multimedia component, or a power key, and an accessory circuit structure thereof. The first energy storage unit 141 is configured to supply power to the electronic component on the first body 10a and/or the second body 10b, and the second energy storage unit 142 is configured to supply power to the electronic component on the first body 10a and/or the second body 10b.

In an embodiment, as shown in FIG. 2, the circuit board assembly 13 may further include a first secondary board 133 and a second secondary board 134. The first secondary board 133 may be mounted in the second mounting groove 115 on the first middle frame 111, and is configured to mount some electronic components on the first body 10a, for example, a component such as an antenna structure, an I/O interface, a motor, or a speaker and an accessory circuit structure thereof. The second secondary board 134 may be mounted in the third mounting groove 116 on the second middle frame 112, and is configured to mount some electronic components on the second body 10b, for example, a component such as an antenna structure, an I/O interface, a motor, or a speaker and an accessory circuit structure thereof. It may be understood that, when the first secondary board 133 and the second secondary board 134 are disposed, the electronic components can be dispersed and properly laid out on the two bodies of the terminal device 101.

In this embodiment, the first middle frame 111 and corresponding other components jointly constitute the first body 10a of the terminal device 101, and the second middle frame 112 and corresponding other components jointly constitute the second body 10b of the terminal device 101. The rotary connection structure 12 is connected between the first body 10a and the second body 10b. The rotary connection structure 12 is used to implement a rotary connection between the first body 10a and the second body 10b, so that the first body 10a and the second body 10b can be folded and unfolded relative to each other.

In this embodiment, the terminal device 101 further includes a through-going shaft connecting piece 17. Both ends of the through-going shaft connecting piece 17 are respectively electrically connected to the first mainboard 131 and the second mainboard 132, and the through-going shaft connecting piece 17 is used to implement an electrical connection between the first mainboard 131 and the second mainboard 132 and transmit all signals exchanged between the first mainboard 131 and the second mainboard 132. The signals exchanged between the first mainboard 131 and the second mainboard 132 include but are not limited to a power supply signal and various communication signals, such as a mobile industry processor interface (Mobile Industry Processor Interface, MIPI) signal of a Camera, a MIPI signal of an OLED, or a GPIO signal.

In this embodiment, the through-going shaft connecting piece 17 is an FPC, and a middle part of the through-going shaft connecting piece 17 is located at a position close to the rotary connection structure 12, and is bent or unfolded along with rotation of the rotary connection structure 12.

In an embodiment, as shown in FIG. 1, a mounting channel 121 is disposed on the rotary connection structure 12, and the middle part of the through-going shaft connecting piece 17 is located in the mounting channel 121 on the rotary connection structure 12.

In an embodiment, a second connection unit 1311 is disposed on the first mainboard 131, and a third connection unit 1321 is disposed on the second mainboard 132. One end of the through-going shaft connecting piece 17 is electrically connected to the second connection unit 1311 on the first mainboard 131, and the other end is electrically connected to the third connection unit 1321 on the second mainboard 132. In an embodiment, the second connection unit 1311 disposed on the first mainboard 131 and the third connection unit 1321 disposed on the second mainboard 132 are separately board-to-board connectors, and correspondingly, board-to-board connectors (not shown in the figure) are also separately disposed on both ends of the through-going shaft connecting piece 17, to be separately electrically connected to the second connection unit 1311 and the third connection unit 1321, to facilitate assembly of and an electrical connection between the through-going shaft connecting piece 17 and the first mainboard 131 and the second mainboard 132, and to facilitate maintenance or replacement of any one of the following components: the first mainboard 131, the second mainboard 132, and the through-going shaft connecting piece 17.

It may be understood that FIG. 1-FIG. 3 only schematically show some structural components included in the terminal device 101, actual construction and positions of these structural components are not limited by FIG. 1-FIG. 3, and the terminal device 101 may actually include more or fewer structural components than the structural components shown in FIG. 1-FIG. 3, for example, the terminal device 101 further includes a processor, a memory, a multimedia component, an antenna structure, another input/output device, and the like. In addition, for ease of understanding, only the energy storage assembly 14 and the circuit board assembly 13 are schematically illustrated in FIG. 2, an electrical connection relationship between the energy storage assembly 14 and the circuit board assembly 13 is not shown, and an electrical connection relationship between the mainboard and the secondary board is not shown either.

In this embodiment, the terminal device 101 can implement electrical connections and signal interactive transmission between the first mainboard 131 on the first body 10a and the second mainboard 132 on the second body 10b by disposing the through-going shaft connecting piece 17 between the first body 10a and the second body 10b that can be folded relative to each other. However, because the through-going shaft connecting piece 17 is disposed on an outer side of the rotary connection structure 12 or integrated on an inner side of the rotary connection structure 12, and is frequently bent or unfolded along with rotation of the rotary connection structure 12, the through-going shaft connecting piece 17 is easily damaged in a bending process or after a plurality of times of bending. Consequently, a problem of an unreliable connection between the two mainboards is caused. In addition, due to existence of the through-going shaft connecting piece 17, bending performance, an assembly structure, and the like of the through-going shaft connecting piece 17 need to be considered during an overall design of the terminal device 101, and this is not conducive to an overall thinning design of the terminal device 101 and also affects overall bending performance of the terminal device 101.

Figure 4:
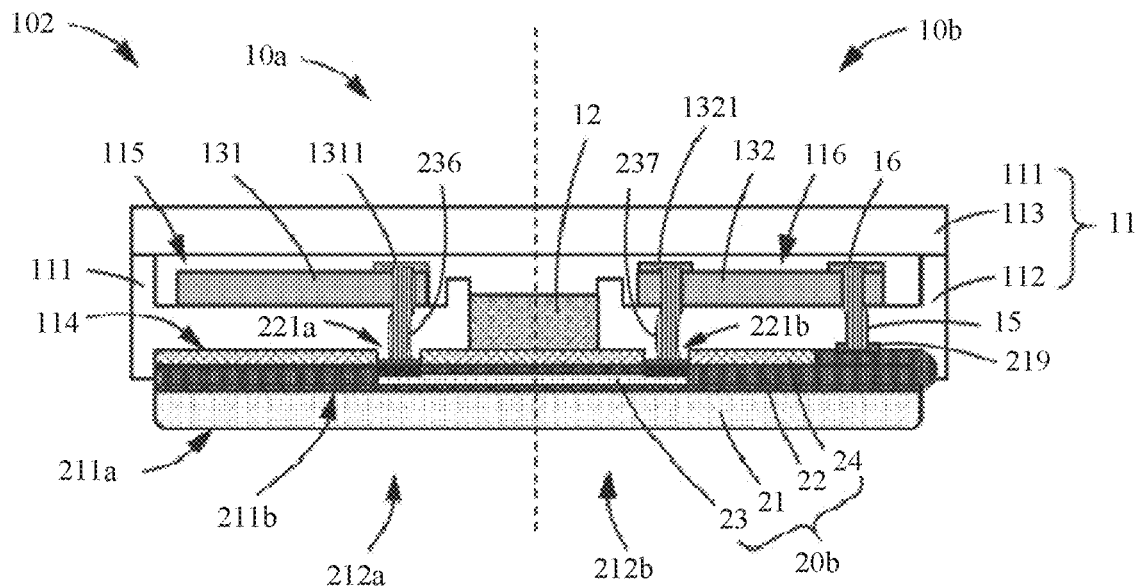
FIG. 4 is a perspective view of a side structure of a second type of terminal device after a partial structure is removed according to an embodiment of this application.
Figure 5:
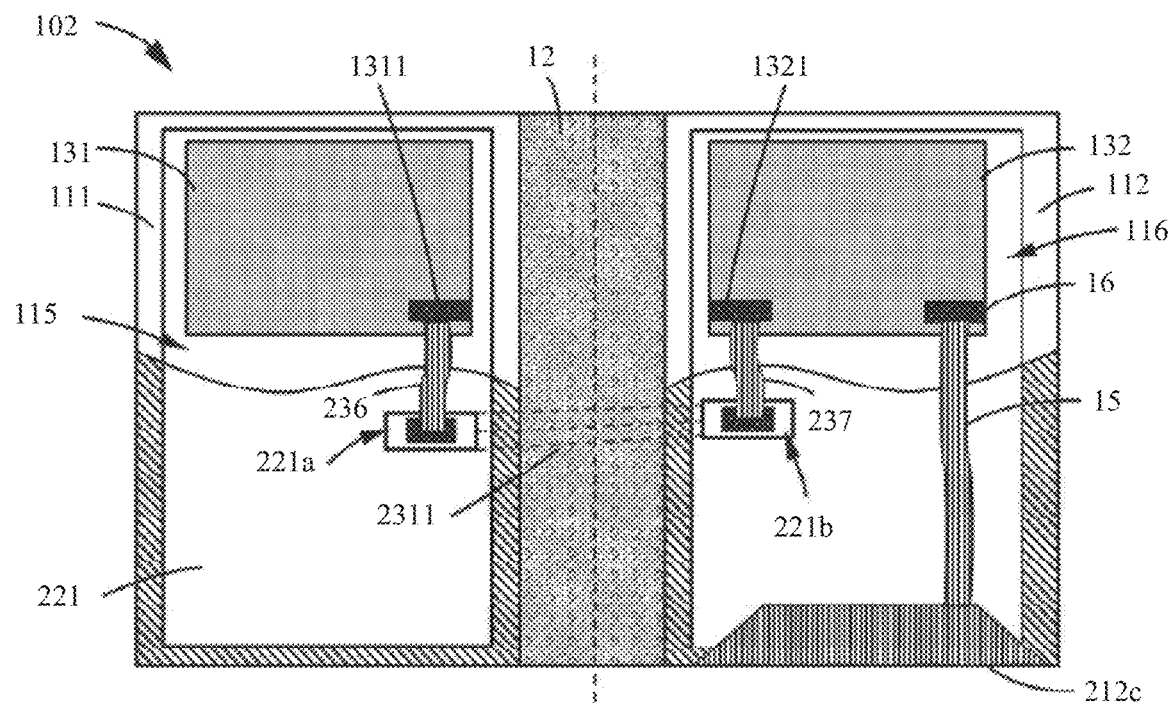
FIG. 5 is a schematic diagram of a planar structure of a back side of a second type of terminal device after a partial structure is removed according to an embodiment of this application.

To avoid various problems caused when the terminal device 101 connects the first mainboard 131 on the first body 10a and the second mainboard 132 on the second body 10b by using the through-going shaft connecting piece 17, refer to both FIG. 4 and FIG. 5. An embodiment of this application further provides a second type of terminal device 102. FIG. 4 is a perspective view of a side structure of the terminal device 102 after a partial structure is removed, for example, a structure such as a first secondary board 133, a second secondary board 134, or an energy storage assembly 14. FIG. 5 is a schematic diagram of a planar structure of a back side (a non-display surface) of the terminal device 102 after a partial structure is removed, for example, a structure such as the first secondary board 133, the second secondary board 134, the energy storage assembly 14, a rear cover 113 shown in FIG. 4, a partial structure of a first middle frame 111, or a partial structure of a second middle frame 112.

A structure of the second type of terminal device 102 shown in FIG. 4 and FIG. 5 is similar to that of the first type of terminal device 101 shown in FIG. 1 and FIG. 2, and a difference lies in that the second type of terminal device 102 does not include a through-going shaft connecting piece 17, and a display apparatus 20b of the second type of terminal device 102 further includes a mainboard connection structure 23 disposed inside a multi-layer protective structure 22. The mainboard connection structure 23 is used to implement an electrical connection between a first mainboard 131 and a second mainboard 132 and transmit all signals exchanged between the first mainboard 131 and the second mainboard 132.

Figure 6:
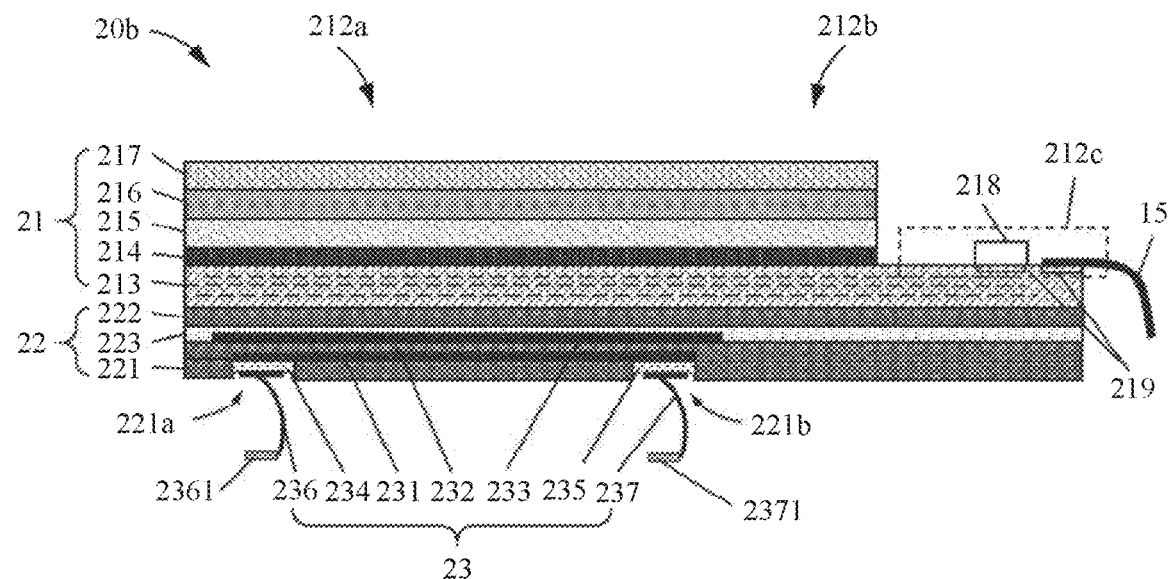
FIG. 6 is a schematic diagram of a stacked structure of a foldable display apparatus of the second type of terminal device shown in FIG. 4, where the display apparatus includes a mainboard connection structure.

Specifically, as shown in FIG. 6, the mainboard connection structure 23 includes a wiring layer 231, an insulation layer 232, and a shielding layer 233 that are stacked at a first protective layer 221 in sequence. The wiring layer 231 is adjacent to the first protective layer 221. In other words, the wiring layer 231 is formed on a surface that is of the first protective layer 221 and that faces a display panel 21. The wiring layer 231 includes a metal wire.

In this embodiment, as shown in FIG. 7a-FIG. 7i, the wiring layer 231 includes a plurality of metal wires 2311 that are not connected to each other. Some metal wires 2311 may be used to transmit a power supply signal, and some metal wires 2311 may be used to transmit a common communication signal such as a MIPI signal of a Camera, a MIPI signal of an OLED, or a GPIO signal. It should be noted that a quantity of metal wires 2311 at the wiring layer 231 may be designed based on an actual requirement, and the quantity of metal wires 2311 is not limited in this application. In FIG. 7a-FIG. 7i, a structure of the metal wire is described by using an example in which the wiring layer 231 includes five or seven metal wires 2311.

A position of a first end of each metal wire 2311 corresponds to a first screen area 212a, and is formed with a first bonding pad 2311a A position of a second end of each metal wire 2311 corresponds to a second screen area 212b, and is formed with a second bonding pad 2311b. In this way, both the first end of each metal wire 2311 and the first bonding pad 2311a are located on a first body 10a, and both the second end of each metal wire 2311 and the second bonding pad 2311b are located on a second body 10b.

Figure 7A:
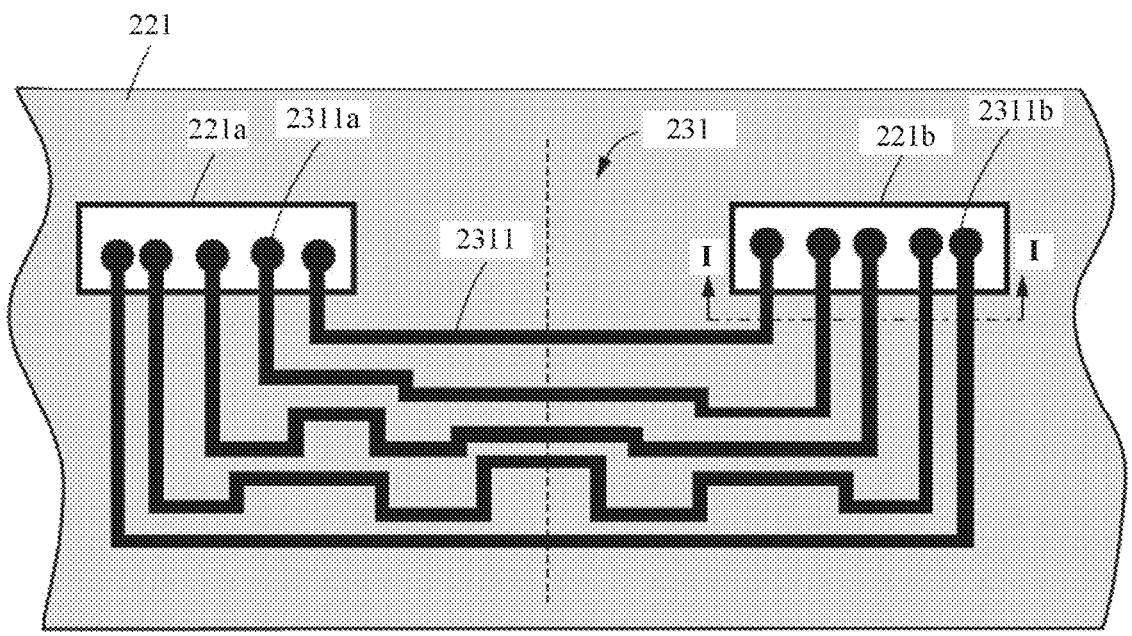
FIG. 7a is a planar schematic diagram of a wiring structure of a wiring layer included in the mainboard connection structure shown in FIG. 6.
Figure 7B:
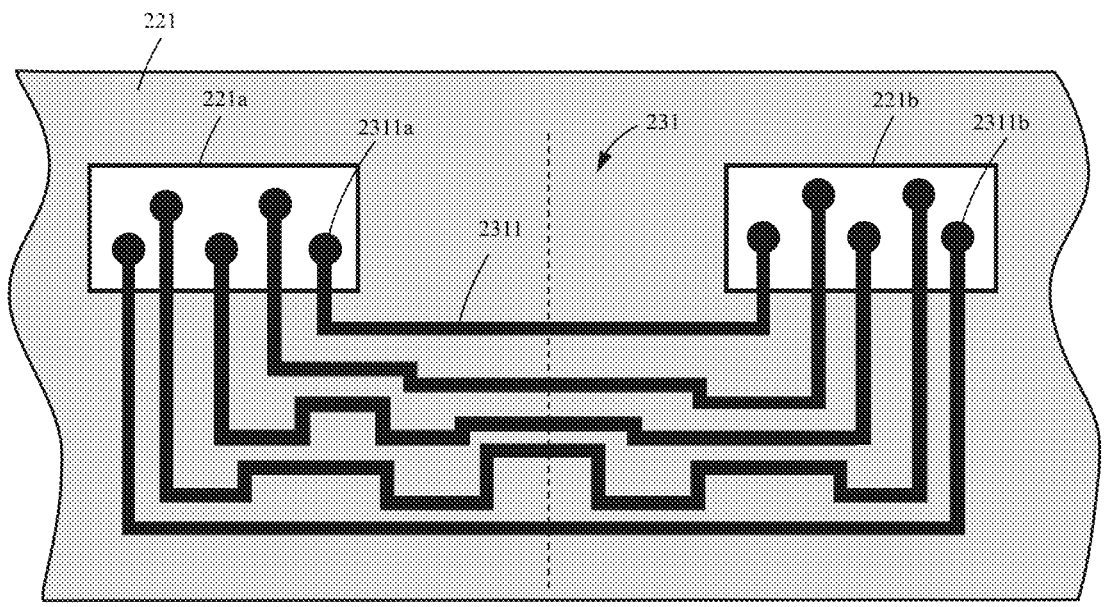
FIG. 7b is another planar schematic diagram of a wiring structure of a wiring layer included in the mainboard connection structure shown in FIG. 6.

A wiring manner of the metal wire 2311 includes but is not limited to a wiring manner such as a straight line, a curve, or a fold line. The metal wires 2311 may have a same wiring pattern, or a wiring pattern of at least one of the plurality of metal wires 2311 may be different from a wiring pattern of another metal wire in the plurality of metal wires 2311, that is, wiring patterns of a same wiring layer may be different. For example, in an embodiment, as shown in FIG. 7a and FIG. 7b, the metal wires 2311 may be wired in an irregular-curve manner, and the metal wires 2311 have different wiring patterns. In this way, corresponding wiring can be flexibly performed at a wiring stage based on an impedance requirement, for wiring, of a signal transmitted by each metal wire 2311. Optionally, in another embodiment, as shown in FIG. 7c-FIG. 7e, all the metal wires 2311 may be wired in a straight-line manner, and the metal wires 2311 have similar wiring patterns, so that uniform wiring of the wiring layer 231 can be facilitated.

Figure 7C:
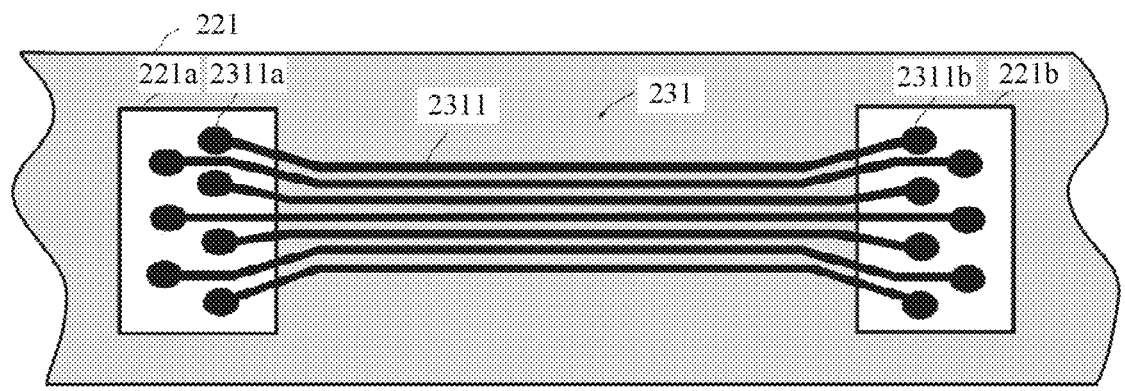
FIG. 7c is another planar schematic diagram of a wiring structure of a wiring layer included in the mainboard connection structure shown in FIG. 6.
Figure 7D:
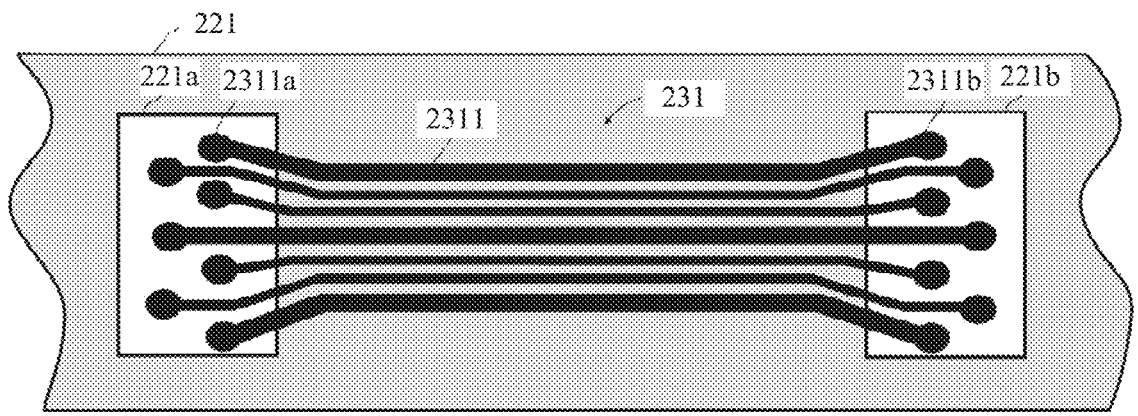
FIG. 7d is another planar schematic diagram of a wiring structure of a wiring layer included in the mainboard connection structure shown in FIG. 6.
Figure 7E:
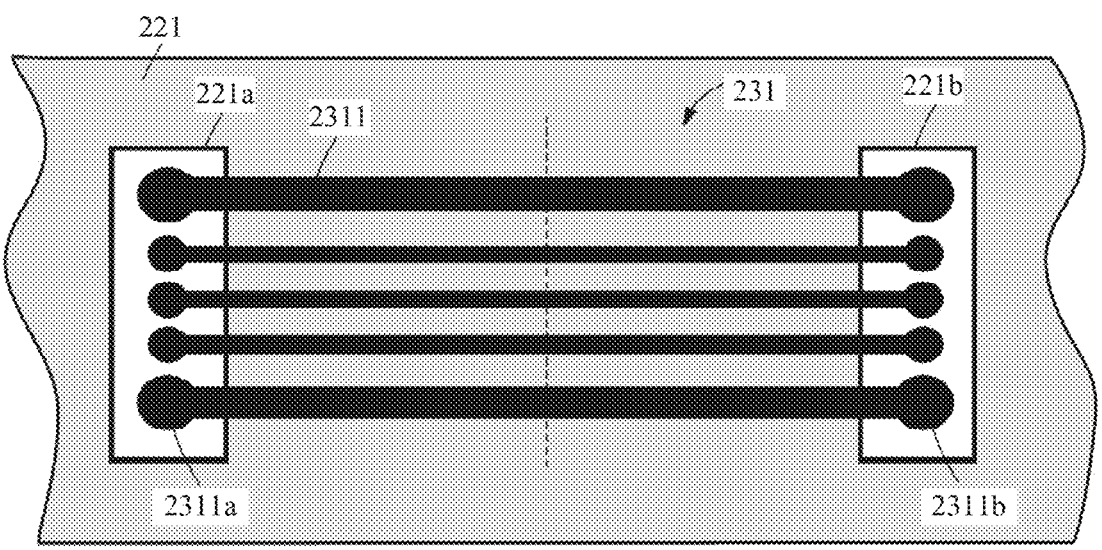
FIG. 7e is another planar schematic diagram of a wiring structure of a wiring layer included in the mainboard connection structure shown in FIG. 6.

In an embodiment, first bonding pads 2311a or second bonding pads 2311b of the plurality of metal wires 2311 may be arranged in a straight line, for example, end parts of the plurality of metal wires 2311 are flush as shown in FIG. 7a or FIG. 7e. Optionally, in another embodiment, first bonding pads 2311a or second bonding pads 2311b of the plurality of metal wires 2311 may be staggered in an irregular manner, for example, end parts of the plurality of metal wires 2311 are not flush as shown in FIG. 7b-FIG. 7d.

In an embodiment, as shown in FIG. 7a-FIG. 7c, the plurality of metal wires 2311 may be the same in width. Optionally, in another embodiment, as shown in FIG. 7d and FIG. 7e, a width of at least one of the plurality of metal wires 2311 is greater than a width of another metal wire 2311 in the plurality of metal wires 2311; in other words, widths of metal wires 2311 at a same wiring layer are different. It may be understood that when a width of the wire is increased, direct-current impedance of the wire can be reduced, and a through-current capability of the wire can be increased, so that metal wires 2311 with different through-current capabilities can be laid out at a same layer. For example, a through-current capability of a metal wire 2311 corresponding to the power supply signal is greater than a through-current capability of a metal wire 2311 corresponding to a common signal. Therefore, a width of the metal wire 2311 corresponding to the power supply signal needs to be greater than a width of the metal wire 2311 corresponding to the common signal.

Figure 7F:
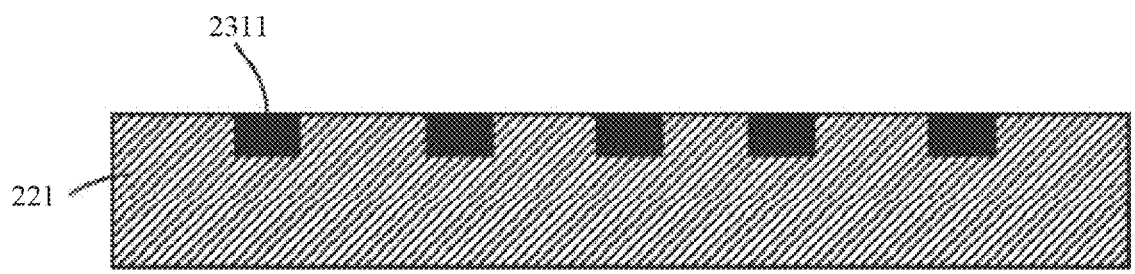
FIG. 7f is a cross-sectional view of the structure shown in FIG. 7a along a line I-I.
Figure 7G:
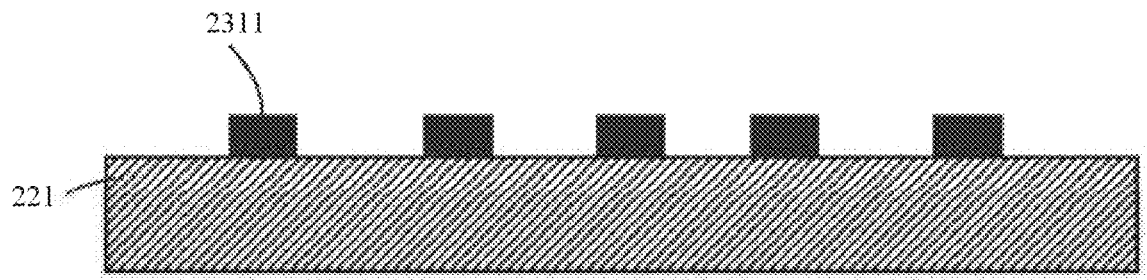
FIG. 7g is another cross-sectional view of the structure shown in FIG. 7a along a line I-I.
Figure 7H:
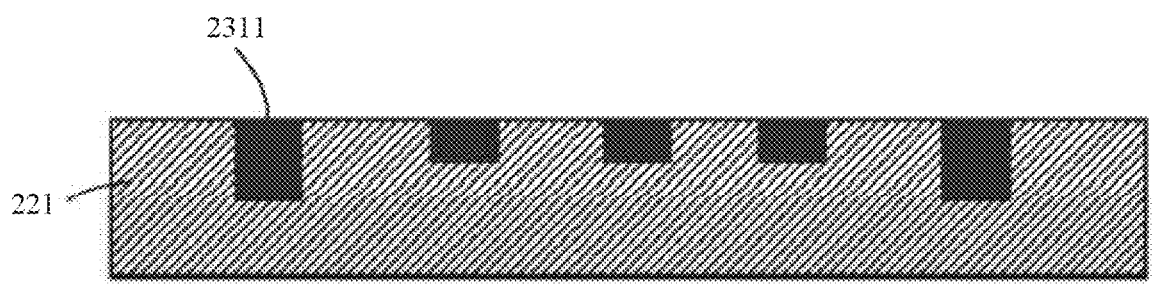
FIG. 7h is another cross-sectional view of the structure shown in FIG. 7a along a line I-I.
Figure 7I:
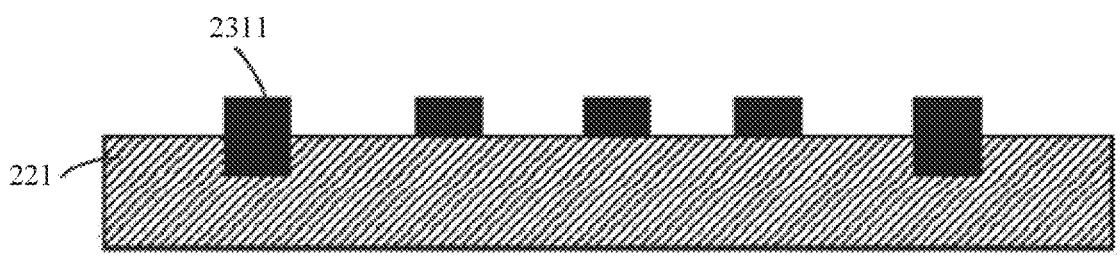
FIG. 7i is another cross-sectional view of the structure shown in FIG. 7a along a line I-I.

In an embodiment, as shown in FIG. 7f and FIG. 7g, the plurality of metal wires 2311 may be the same in thickness. Optionally, in another embodiment, as shown in FIG. 7h and FIG. 7i, a thickness of at least one of the plurality of metal wires 2311 is greater than a thickness of another metal wire 2311 in the plurality of metal wires 2311; in other words, thicknesses of metal wires 2311 at a same wiring layer are different. It may be understood that when a thickness of the wire is increased, direct-current impedance of the wire can be reduced, and a through-current capability of the wire can be increased, so that metal wires 2311 with different through-current capabilities can be laid out at a same layer. For example, a thickness of the metal wire 2311 corresponding to the power supply signal needs to be greater than a thickness of the metal wire 2311 corresponding to the common signal.

It should be noted that a specific wiring pattern, a wiring width, a wiring thickness, and the like of each metal wire 2311 may be designed based on an actual wiring requirement and a surrounding wiring environment, and a specific wiring structure of each metal wire 2311 is not specifically limited in this application.

In this embodiment, both the wiring layer 231 and the shielding layer 233 are metal layers, and a material may be a common metal with excellent conductivity such as Ti—Al or Ti—Cu. The insulation layer 232 may be made of a PI material.

In an embodiment, as shown in FIG. 6, the shielding layer 233 is located between the insulation layer 232 and the third protective layer 223; in other words, the shielding layer 233 is closer to the display panel 21 than the wiring layer 231. The shielding layer 233 entirely covers the wiring layer 231. The shielding layer 233 is used to provide an isolation function and a shielding function to prevent signals transmitted by the plurality of metal wires 2311 at the wiring layer 231 from interfering with a line inside the display panel 21. In an embodiment, the third protective layer 223 is located between the second protective layer 222 and the shielding layer 233. In the display apparatus 20b shown in FIG. 6, the mainboard connection structure 23 may be understood as being formed in a stacked structure of the multi-layer protective structure 22 shown in FIG. 3.

Figure 8:
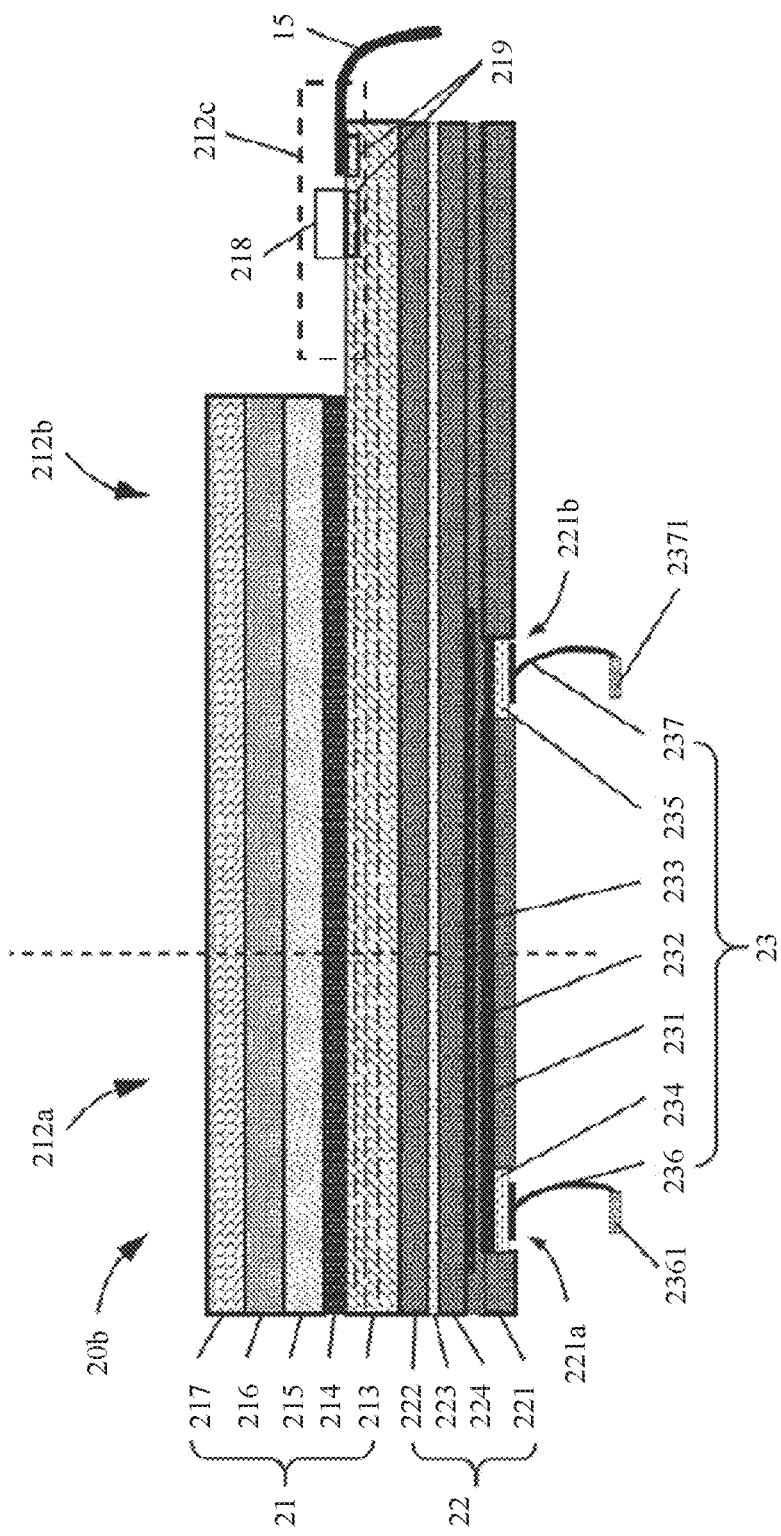
FIG. 8 is a schematic diagram of another structure of a foldable display apparatus of the second type of terminal device shown in FIG. 4.

In another embodiment, as shown in FIG. 8, the multi-layer protective structure 22 further includes a fourth protective layer 224, and the fourth protective layer 224 is located between the third protective layer 223 and the shielding layer 233. In this embodiment, the fourth protective layer 224 may be made of an insulating material such as a PI material. The fourth protective layer 224 is used to cooperate with the first protective layer 221, the second protective layer 222, and the third protective layer 223 to form a structure for isolating water vapor, to provide a carrying function and a water vapor blocking function for the display panel 21. In a display apparatus 20b shown in FIG. 8, the mainboard connection structure 23 may also be understood as being formed on a surface that is of the multi-layer protective structure 22 shown in FIG. 3 and that is away from the display panel 21, a first protective layer 221 shown in FIG. 8 may be understood as a one-layer structure of the mainboard connection structure 23, and a fourth protective layer 224 shown in FIG. 8 may be understood as corresponding to the first protective layer 221 shown in FIG. 3.

Refer to FIG. 5, FIG. 6, and FIG. 8 together again. A first pad area 221a is provided at a position that is at the first protective layer 221 and that is corresponding to the first bonding pad 2311a of each metal wire 2311, and the first pad area 221a is used to expose the first bonding pads 2311a of the plurality of metal wires 2311. A second pad area 221b is provided at a position that is at the first protective layer 221 and that is corresponding to the second bonding pad 2311b of each metal wire 2311, and the first pad area 221a is used to expose the second bonding pads 2311b of the plurality of metal wires 2311.

In this embodiment, the mainboard connection structure 23 further includes a first connecting piece 236 and a second connecting piece 237. A first end of the first connecting piece 236 is disposed in the first pad area 221a and is electrically connected to the first bonding pad 2311a of the metal wire 2311. A first end of the second connecting piece 237 is disposed in the second pad area 221b and is electrically connected to the second bonding pad 2311b of the metal wire 2311.

Specifically, the first connecting piece 236 includes a plurality of first transmission lines (not shown in the figure) and a plurality of third bonding pads (not shown in the figure) disposed at the first end of the first connecting piece 236. The plurality of third bonding pads are electrically connected to the plurality of first transmission lines in a one-to-one manner, and the plurality of third bonding pads are further electrically connected in a one-to-one manner to the first bonding pads 2311a that are of the plurality of metal wires 2311 and that are exposed in the first pad area 221a. For example, each third bonding pad of the first connecting piece 236 is welded to the first bonding pad 2311a of the corresponding metal wire 2311. It may be understood that the plurality of third bonding pads of the first connecting piece 236 are insulated from each other and may be disposed in a third pad area (not shown in the figure) at the first end of the first connecting piece 236, and a manner of arranging the plurality of third pads in the third pad area is the same as a manner of arranging the first bonding pads 2311a of the plurality of metal wires 2311 in the first pad area 221a, to facilitate welding of the plurality of third bonding pads to the plurality of first bonding pads 2311a in the first pad area 221a.

The second connecting piece 237 includes a plurality of second transmission lines (not shown in the figure) and a plurality of fourth bonding pads (not shown in the figure) disposed at the first end of the second connecting piece 237. The plurality of fourth bonding pads are electrically connected to the plurality of second transmission lines in a one-to-one manner, and the plurality of fourth bonding pads are further electrically connected to in a one-to-one manner to the second bonding pads 2311b that are of the plurality of metal wires 2311 and that are exposed in the second pad area 221b. For example, each fourth bonding pad of the second connecting piece 237 is welded to the second bonding pad 2311b of the corresponding metal wire 2311. It may be understood that the plurality of fourth bonding pads of the second connecting piece 237 are insulated from each other and may be disposed in a fourth pad area (not shown in the figure) at the first end of the second connecting piece 237. A manner of arranging the plurality of fourth bonding pads in the fourth pad area is the same as a manner of arranging the second bonding pads 2311b of the plurality of metal wires 2311 in the second pad area 221b, to facilitate welding of the plurality of fourth bonding pads to the plurality of second bonding pads 2311b in the second pad area 221b.

In this embodiment, the mainboard connection structure 23 further includes a conductor 234 disposed in the first pad area 221a and a conductor 235 disposed in the second pad area 221b. The conductor 234 disposed in the first pad area 221a is used to implement one-to-one electrical connections between the first bonding pads 2311a of the plurality of metal wires 2311 and the plurality of third bonding pads included in the first connecting piece 236. The electrical conductor 235 disposed in the second pad area 221b is used to implement one-to-one electrical connections between the second bonding pads 2311b of the plurality of metal wires 2311 and the plurality of fourth bonding pads included in the second connecting piece 237.

In this embodiment, the conductor 234 is filled in the first pad area 221a, the conductor 235 is filled in the second pad area 221b, and both the conductors 234 and 235 are anisotropic conductive films (Anisotropic Conductive Film, ACF), that is, the conductors 234 and 235 are electrically conductive in a longitudinal direction and insulated in a lateral direction. In other words, the conductors 234 and 235 provide conductive channels in a thickness direction of the display apparatus 20b, and are insulated in a direction perpendicular to the thickness direction of the display apparatus 20b. Therefore, the conductor 234 filled in the first pad area 221a can implement one-to-one electrical connections between the first bonding pads 2311a of the plurality of metal wires 2311 and the plurality of third bonding pads of the first connecting piece 236, can effectively avoid a short circuit between the plurality of metal wires 2311, and can also avoid a short circuit between the plurality of first transmission lines included in the first connecting piece 236, and the conductor 235 filled in the second pad area 221b can implement one-to-one electrical connections between the second bonding pads 2311b of the plurality of metal wires 2311 and the plurality of fourth bonding pads of the second connecting piece 237, can effectively avoid a short circuit between the plurality of metal wires 2311, and can also avoid a short circuit between the plurality of second transmission lines included in the second connecting piece 237.

In this way, through the conductor 234 filled in the first pad area 221a, signals on the plurality of third bonding pads of the first connecting piece 236 can be longitudinally conducted to the first bonding pads 2311a of the corresponding metal wires 2311 and then input into the corresponding metal wires 2311, or signals on the first bonding pads 2311a of the plurality of metal wires 2311 can be longitudinally conducted to corresponding third bonding pads of the first connecting piece 236 and then input into corresponding first transmission lines. Through the conductor 235 filled in the second pad area 221b, signals on the second bonding pads 2311b of the plurality of metal wires 2311 can be longitudinally conducted to the corresponding fourth bonding pads of the second connecting piece 237 and then input into corresponding second transmission lines, or signals on the plurality of fourth bonding pads of the second connecting piece 237 can be longitudinally conducted to the second bonding pads 2311b of the corresponding metal wires 2311 and then input into the corresponding metal wires 2311.

In another embodiment, the conductor 234 is separately coated on the first bonding pads 2311a of the plurality of metal wires 2311, the conductor 235 is separately coated on the second bonding pads 2311b of the plurality of metal wires 2311, and both the conductors 234 and 235 are brazing filler metals. The plurality of third bonding pads included in the first connecting piece 236 are attached to the first bonding pads 2311a of the plurality of metal wires 2311, and the plurality of fourth bonding pads included in the second connecting piece 237 are attached to the second bonding pads 2311b of the plurality of metal wires 2311, and then two corresponding pads are welded by locally heating the brazing filler metal by using lasers.

In this embodiment, both the first mainboard 131 and the first connecting piece 236 are disposed inside the first body 10a, and the first mainboard 131 is electrically connected to the second end of the first connecting piece 236. Both the second mainboard 132 and the second connecting piece 237 are disposed inside the second body 10b, and the second mainboard 132 is electrically connected to the second end of the second connecting piece 237. The first connecting piece 236, the plurality of metal wires 2311, and the second connecting piece 237 are used to implement an electrical connection between the first mainboard 131 and the second mainboard 132 and transmit at least some signals exchanged between the first mainboard 131 and the second mainboard 132.

In the embodiments shown in FIG. 4 and FIG. 5, the first connecting piece 236, the plurality of metal wires 2311, and the second connecting piece 237 are used to transmit all signals exchanged between the first mainboard 131 and the second mainboard 132.

In this embodiment, both the first connecting piece 236 and the second connecting piece 237 are FPCs. In an embodiment, the second connection unit 1311 disposed on the first mainboard 131 and the third connection unit 1321 disposed on the second mainboard 132 may be separately board-to-board connectors. Correspondingly, a board-to-board connector 2361 may be disposed at the second end of the first connecting piece 236, and bonding pads that are separately electrically connected to second ends of the plurality of first transmission lines included in the first connecting piece 236 are disposed on the board-to-board connector 2361. A board-to-board connector 2371 may be disposed at the second end of the second connecting piece 237, and bonding pads that are separately electrically connected to second ends of the plurality of second transmission lines included in the second connecting piece 237 are disposed on the board-to-board connector 2371. The first connecting piece 236 is electrically connected to the second connection unit 1311 on the first mainboard 131 by using the board-to-board connector 2361, and the second connecting piece 237 is electrically connected to the third connection unit 1321 on the second mainboard 132 by using the board-to-board connector 2371.

In this embodiment, the terminal device 102 integrates the mainboard connection structure 23 at a back side of the flexible display panel 21 of the foldable display apparatus 20b, uses the wiring layer 231 included in the mainboard connection structure 23 to implement an interconnection between the two mainboards (the first mainboard 131 and the second mainboard 132) on two foldable bodies (the first body 10a and the second body 10b) on the terminal device 102 and transmit all the signals exchanged between the first mainboard 131 and the second mainboard 132, and uses the shielding layer 233 included in the mainboard connection structure 23 to ensure that a signal transmitted by the wiring layer 231 does not affect normal operation of a circuit structure of the display panel 21. Compared with the first type of terminal device 101, the terminal device 102 transfers all lines of the through-going shaft connecting piece 17 to the back side of the display panel 21 without using the through-going shaft connecting piece 17, so that bending performance of the terminal device 102 can be improved, and there is no reliability problem that the through-going shaft connecting piece 17 is damaged after being bent. Therefore, reliability of the interconnection between the two mainboards can be ensured, and further an overall thickness of the terminal device 102 can be reduced, thereby facilitating a thinning design of the terminal device 102.

Figure 9:
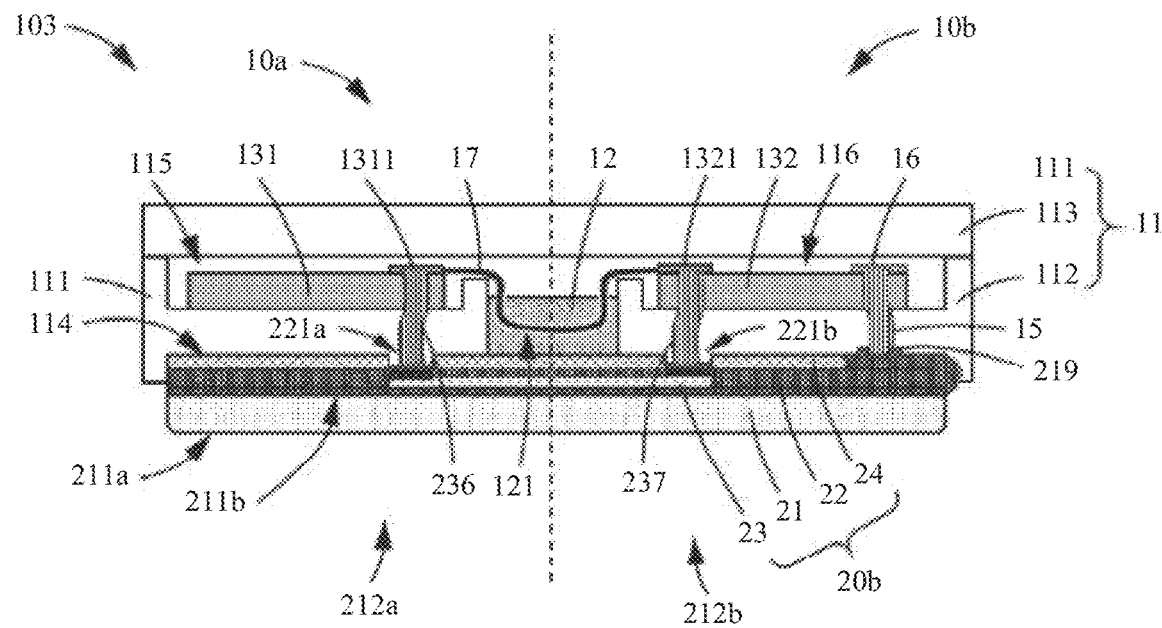
FIG. 9 is a perspective view of a side structure of a third type of terminal device after a partial structure is removed according to an embodiment of this application.
Figure 10:
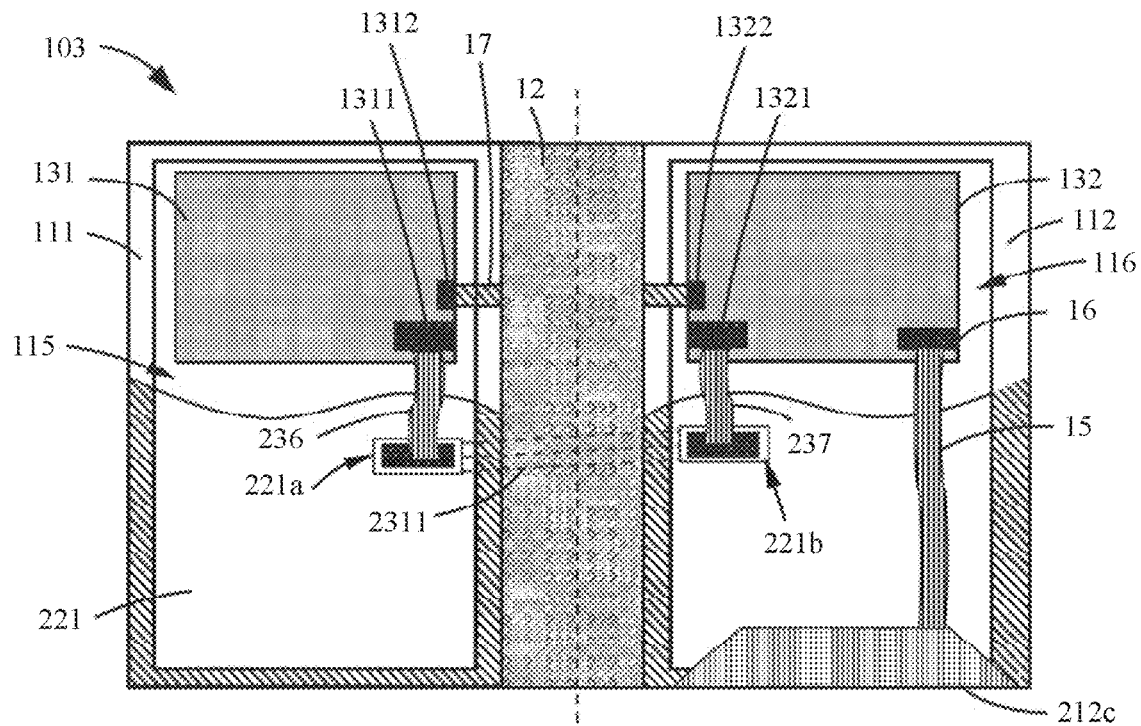
FIG. 10 is a schematic diagram of a planar structure of a back side of a third type of terminal device after a partial structure is removed according to an embodiment of this application.

Refer to both FIG. 9 and FIG. 10. An embodiment of this application further provides a third type of terminal device 103. FIG. 9 is a perspective view of a side structure of the terminal device 103 after a partial structure is removed, for example, a structure such as a first secondary board 133, a second secondary board 134, or an energy storage assembly 14. FIG. 10 is a schematic diagram of a planar structure of a back side (a non-display surface) of the terminal device 103 after a partial structure is removed, for example, a structure such as the first secondary board 133, the second secondary board 134, the energy storage assembly 14, a rear cover 113 shown in FIG. 9, a partial structure of a first middle frame 111, or a partial structure of a second middle frame 112.

A structure of the third type of terminal device 103 shown in FIG. 9 and FIG. 10 is similar to that of the second type of terminal device 102 shown in FIG. 4 and FIG. 5, and a difference lies in that the third type of terminal device 103 further includes a through-going shaft connecting piece 17, where the through-going shaft connecting piece 17 is used to implement an electrical connection between a first mainboard 131 and a second mainboard 132 and transmit a first part of signals exchanged between the first mainboard 131 and the second mainboard 132, and a mainboard connection structure 23 is used to implement an electrical connection between the first mainboard 131 and the second mainboard 132 and transmit a second part of signals exchanged between the first mainboard 131 and the second mainboard 132. The first part of signals and the second part of signals are different signals. For example, the first part of signals may include a power supply signal, or may include a power supply signal and some communication signal, and the second part of signals may include at least some communication signals. Alternatively, the first part of signals may include at least some communication signals, and the second part of signals may include a power supply signal, or may include a power supply signal and some communication signals. The communication signal includes but is not limited to a MIPI signal of a Camera, a MIPI signal of an OLED, a GPIO signal, and the like.

A fourth connection unit 1312 may be further disposed on the first mainboard 131, and a fifth connection unit 1322 may be further disposed on the second mainboard 132. One end of the through-going shaft connecting piece 17 is electrically connected to the fourth connection unit 1312 on the first mainboard 131, and the other end is electrically connected to the fifth connection unit 1322 on the second mainboard 132. In an embodiment, the fourth connection unit 1312 and the fifth connection unit 1322 may be separately board-to-board connectors. Correspondingly, board-to-board connectors (not shown in the figure) may also be separately disposed on both ends of the through-going shaft connecting piece 17 to be separately electrically connected to the fourth connection unit 1312 and the fifth connection unit 1322, to facilitate assembly of and an electrical connection between the through-going shaft connecting piece 17 and the first mainboard 131 and the second mainboard 132, and to facilitate maintenance or replacement of any one of the following components: the first mainboard 131, the second mainboard 132, and the through-going shaft connecting piece 17.

It should be noted that although the through-going shaft connecting piece 17 shown in FIG. 9 and FIG. 10 transmits only some signals exchanged between the first mainboard 131 and the second mainboard 132, a related structure of the through-going shaft connecting piece 17 is similar to that of the through-going shaft connecting piece 17 shown in FIG. 1 and FIG. 2. For specific technical details, refer to the foregoing specific descriptions of the structure shown in FIG. 1 and FIG. 2. Details are not repeated herein.

Similarly, although the mainboard connection structure 23 shown in FIG. 9 and FIG. 10 transmits only some signals exchanged between the first mainboard 131 and the second mainboard 132, a related structure of the mainboard connection structure 23 is the same as or similar to that of the mainboard connection structure 23 shown in FIG. 4-FIG. 8. For specific technical details, refer to the foregoing specific descriptions of the structure shown in FIG. 4-FIG. 8. Details are not repeated herein.

In this embodiment, the terminal device 103 integrates the mainboard connection structure 23 at a back side of the flexible display panel 21 of the foldable display apparatus 20b, uses the wiring layer 231 included in the mainboard connection structure 23 to implement an interconnection between the two mainboards (the first mainboard 131 and the second mainboard 132) on two foldable bodies (the first body 10a and the second body 10b) on the terminal device 103 and transmit all signals exchanged between the first mainboard 131 and the second mainboard 132, and uses the shielding layer 233 included in the mainboard connection structure 23 to ensure that a signal transmitted by the wiring layer 231 does not affect normal operation of a circuit structure of the display panel 21. In comparison with the first type of terminal device 101, the terminal device 103 reserves the through-going shaft connecting piece 17, but transfers some lines of the through-going shaft connecting piece 17 to the back side of the display panel 21, so that a thickness of the through-going shaft connecting piece 17 can be reduced. Therefore, the terminal device 103 can implement a smaller bending radius, bending performance can be improved, reliability problems can be reduced, and in addition, an overall thickness of the terminal device 103 can be reduced, to implement a thinning design of the terminal device 103.

Refer to FIG. 11A-FIG. 12c together. A first embodiment of this application provides a manufacturing method for a foldable display apparatus. The display apparatus may correspond to the display apparatus 20b shown in FIG. 6 or FIG. 8, and the display apparatus 20b may be applied to the terminal device 102 shown in FIG. 4 and FIG. 5 or the terminal device 103 shown in FIG. 9 and FIG. 10. The manufacturing method includes but is not limited to the following steps.

Step 1101: Provide a carrier 300.

The carrier 300 may be a carrier such as a glass substrate.

Step 1102: Form a first protective layer 221 on the carrier 300.

In this embodiment, the first protective layer 221 may be made of an insulating material such as PI. The first protective layer 221 may be formed by applying PI solution on the carrier 300 and then performing a baking and curing process.

Step 1103: Form a wiring layer 231 at the first protective layer 221.

The wiring layer 231 includes a metal wire. In this embodiment, as shown in FIG. 7a-FIG. 7i, the wiring layer 231 includes a plurality of metal wires 2311 that are not connected to each other. A position of a first end of each metal wire 2311 corresponds to a first screen area 212a of a display panel 21, and is formed % with a first bonding pad 2311a. A position of a second end of each metal wire 2311 corresponds to a second screen area 212b of the display panel 21, and is formed with a second bonding pad 2311b.

In this embodiment, the wiring layer 231 is a metal layer and may be manufactured by using a semiconductor process, for example, the plurality of metal wires 2311 may be formed at the first protective layer 221 by using a process such as metal layer sputtering, photoresist coating, exposure, developing, or etching. Each metal wire 2311 may be made of common metal with excellent conductivity, such as Ti—Al or Ti—Cu.

In this embodiment, the plurality of metal wires 2311 formed at the wiring layer 231 are used to implement an electrical connection between the first mainboard 131 and the second mainboard 132 of the terminal device 102 or the terminal device 103 and transmit at least some signals exchanged between the first mainboard 131 and the second mainboard 132. Some metal wires 2311 may be used to transmit a power supply signal, and some metal wires 2311 may be used to transmit a common communication signal such as a MIPI signal of a Camera, a MIPI signal of an OLED, or a GPIO signal. It should be noted that a quantity of metal wires 2311 at the wiring layer 231 may be designed based on an actual requirement, and the quantity of metal wires 2311 is not limited in this application. In FIG. 7a-FIG. 7i, a structure of the metal wire is described by using an example in which the wiring layer 231 includes five or seven metal wires 2311.

In this embodiment, a wiring manner of the metal wire 2311 includes but is not limited to a wiring manner such as a straight line, a curve, or a fold line. The metal wires 2311 may have a same wiring pattern, or a wiring pattern of at least one of the plurality of metal wires 2311 may be different from a wiring pattern of another metal wire in the plurality of metal wires 2311, that is, wiring patterns of a same wiring layer may be different. For example, in an embodiment, as shown in FIG. 7a and FIG. 7b, the metal wires 2311 may be wired in an irregular-curve manner, and the metal wires 2311 have different wiring patterns. In this way, corresponding wiring can be flexibly performed at a wiring stage, that is, in step 1103, based on an impedance requirement, for wiring, of a signal transmitted by each metal wire 2311. Optionally, in another embodiment, as shown in FIG. 7c-FIG. 7e, all the metal wires 2311 may be wired in a straight-line manner, and the metal wires 2311 have similar wiring patterns, so that uniform wiring of the wiring layer 231 can be facilitated.

In an embodiment, first bonding pads 2311a or second bonding pads 2311b of the plurality of metal wires 2311 may be arranged in a straight line, for example, end parts of the plurality of metal wires 2311 are flush as shown in FIG. 7a or FIG. 7e. Optionally, in another embodiment, first bonding pads 2311a or second bonding pads 2311b of the plurality of metal wires 2311 may be staggered in an irregular manner, for example, end parts of the plurality of metal wires 2311 are not flush as shown in FIG. 7b-FIG. 7d.

In an embodiment, as shown in FIG. 7a-FIG. 7c, the plurality of metal wires 2311 may be the same in width. Optionally, in another embodiment, as shown in FIG. 7d and FIG. 7e, a width of at least one of the plurality of metal wires 2311 is greater than a width of another metal wire 2311 in the plurality of metal wires 2311; in other words, widths of metal wires 2311 at a same wiring layer are different. It may be understood that when a width of the wire is increased, direct-current impedance of the wire can be reduced, and a through-current capability of the wire can be increased, so that metal wires 2311 with different through-current capabilities can be laid out at a same layer. For example, a through-current capability of a metal wire 2311 corresponding to the power supply signal is greater than a through-current capability of a metal wire 2311 corresponding to a common signal. Therefore, a width of the metal wire 2311 corresponding to the power supply signal needs to be greater than a width of the metal wire 2311 corresponding to the common signal.

In an embodiment, as shown in FIG. 7f and FIG. 7g, the plurality of metal wires 2311 may be the same in thickness. Optionally, in another embodiment, as shown in FIG. 7h and FIG. 7i, a thickness of at least one of the plurality of metal wires 2311 is greater than a thickness of another metal wire 2311 in the plurality of metal wires 2311; in other words, thicknesses of metal wires 2311 at a same wiring layer are different. It may, be understood that when a thickness of the wire is increased, direct-current impedance of the wire can be reduced, and a through-current capability of the wire can be increased, so that metal wires 2311 with different through-current capabilities can be laid out at a same layer. For example, a thickness of the metal wire 2311 corresponding to the power supply signal needs to be greater than a thickness of the metal wire 2311 corresponding to the common signal.

It should be noted that a specific wiring pattern, a wiring width, a wiring thickness, and the like of each metal wire 2311 may be designed based on an actual wiring requirement and a surrounding wiring environment, and a specific wiring structure of each metal wire 2311 is not specifically limited in this application.

Figure 12A:
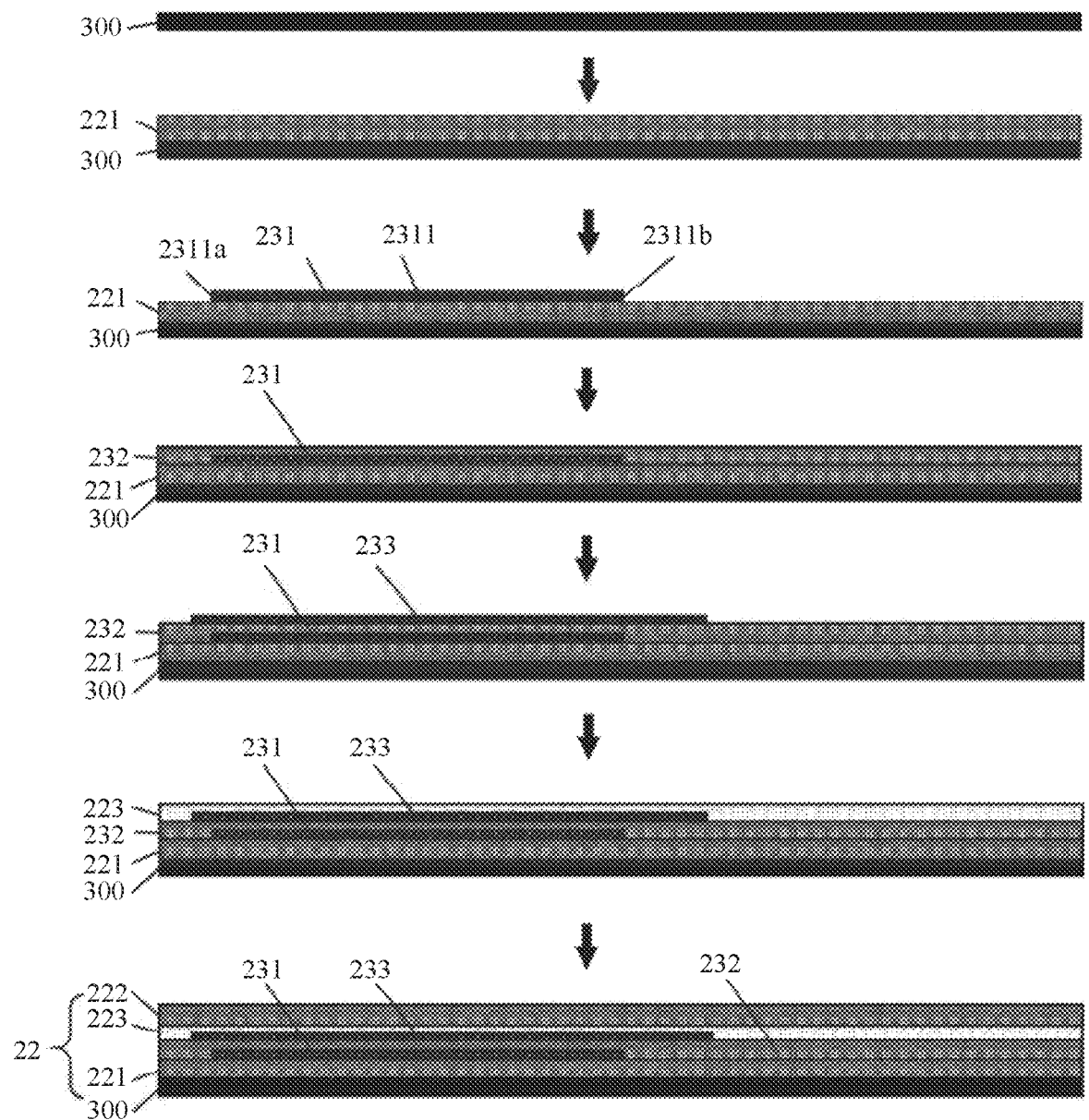
FIG. 12a is a schematic diagram 1 of a manufacturing process of a foldable display apparatus according to a first embodiment of this application.

In an embodiment, as shown in FIG. 12a and FIG. 7g, all the plurality of metal wires 2311 may be formed on a surface that is of the first protective layer 221 and that is away from the carrier 300.

Figure 13A:
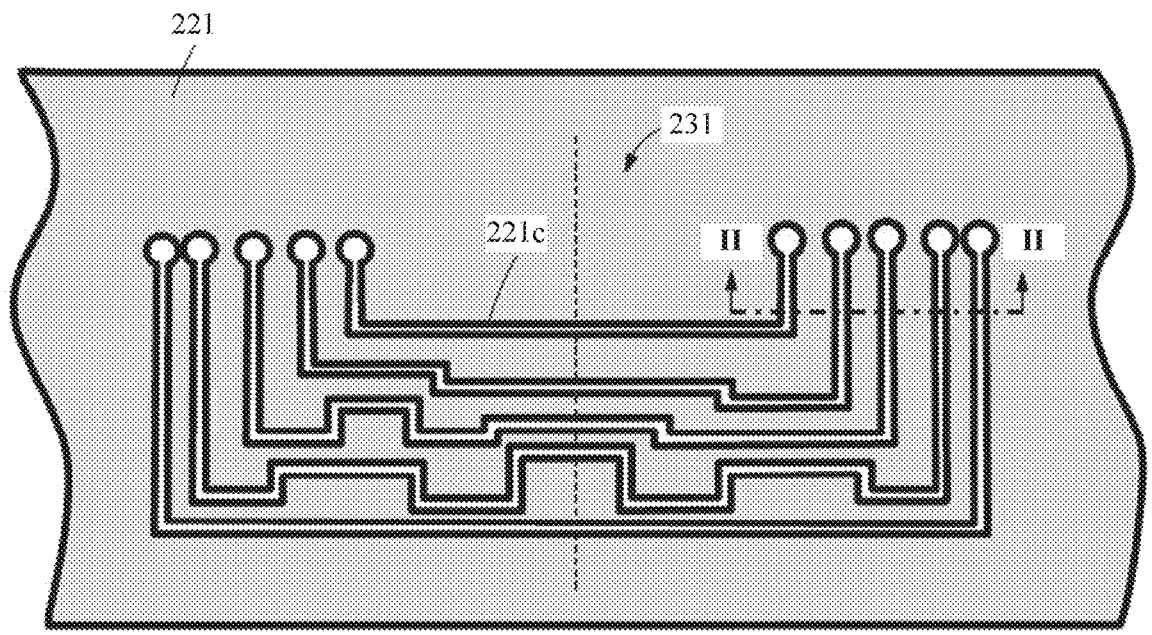
Figure 13B:
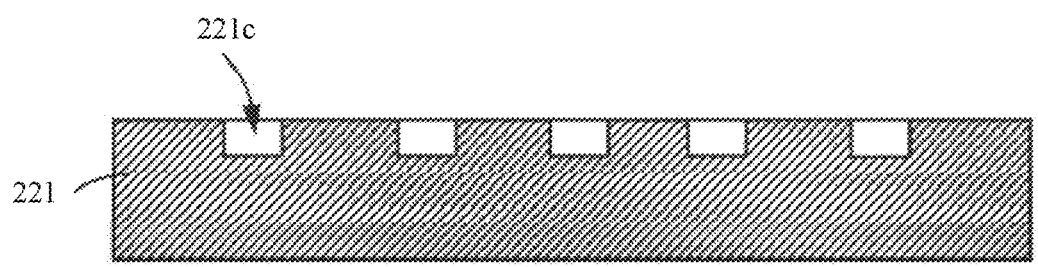
FIG. 13b is a cross-sectional view of a structure shown in FIG. 13a along a line II-II.
Figure 13C:
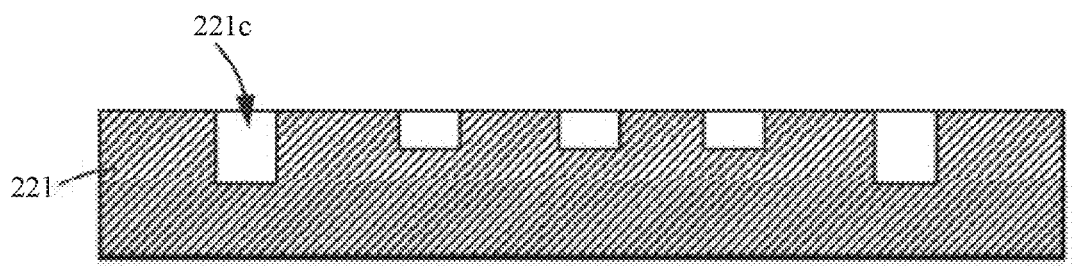
FIG. 13c is another cross-sectional view of a structure shown in FIG. 13a along a line II-II.

Optionally, in another embodiment, as shown in FIG. 13a-FIG. 13c, step 1103 may specifically include:

forming a plurality of grooves 221c on the surface that is of the first protective layer 221 and that is away from the carrier 300.

The plurality of metal wires 2311 of the wiring layer 231 are formed in the plurality of grooves 221c at the first protective layer 221, or the plurality of metal wires 2311 of the wiring layer 231 are formed in the plurality of grooves 221c and on the surface that is of the first protective layer 221 and that is away from the carrier 300.

Specifically, in some implementations, as shown in FIG. 13a-FIG. 13c, a quantity of the plurality of grooves 221c is equal to a quantity of the plurality of metal wires 2311, and all the plurality of metal wires 2311 are formed in the plurality of grooves 221c.

As shown in FIG. 13a-FIG. 13c, the plurality of grooves 221c may be the same in width. Correspondingly, as shown in FIG. 7a-FIG. 7b, the plurality of metal wires 2311 may also be the same in width. Optionally, in another implementation, a width of at least one of the plurality of grooves 221c may be greater than a width of another groove 221c in the plurality of grooves 221c. Correspondingly, as shown in FIG. 7d or FIG. 7e, a width of at least one of the plurality of metal wires 2311 is greater than a width of another metal wire 2311 in the plurality of metal wires 2311.

As shown in FIG. 13b, the plurality of grooves 221c may be the same in depth. Correspondingly, as shown in FIG. 7f, the plurality of metal wires 2311 may also be the same in thickness. Optionally, as shown in FIG. 13c, a depth of at least one of the plurality of grooves 221c is greater than a depth of another groove 221c in the plurality of grooves 221c. Correspondingly, as shown in FIG. 7h, a thickness of at least one of the plurality of metal wires 2311 is greater than a thickness of another metal wire 2311 in the plurality of metal wires 2311.

Figure 14A:
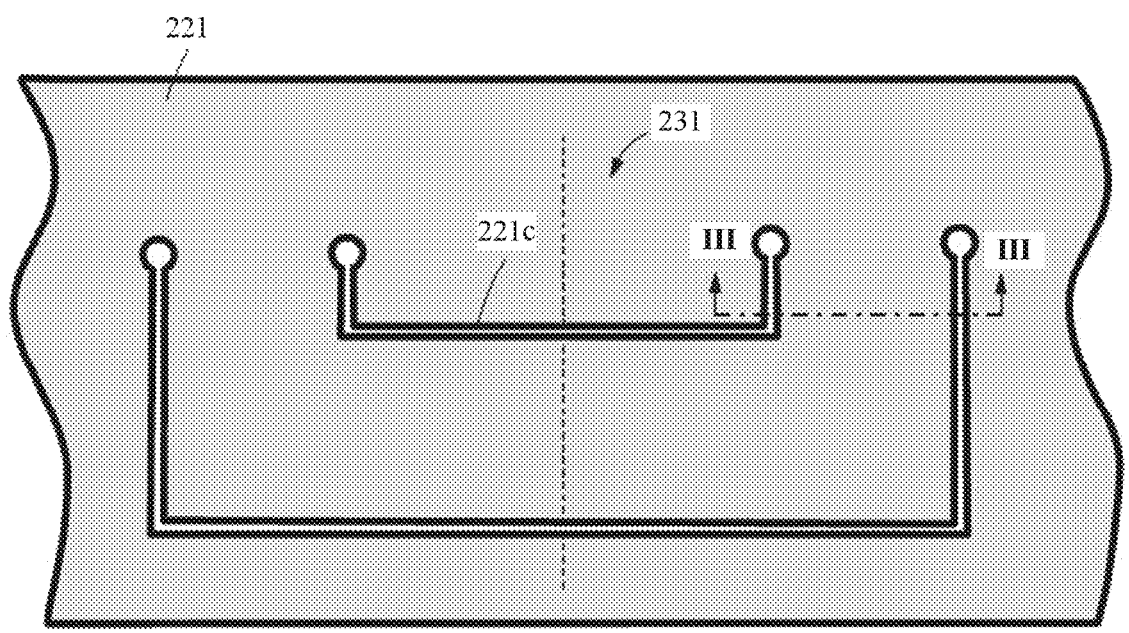
Figure 14B:
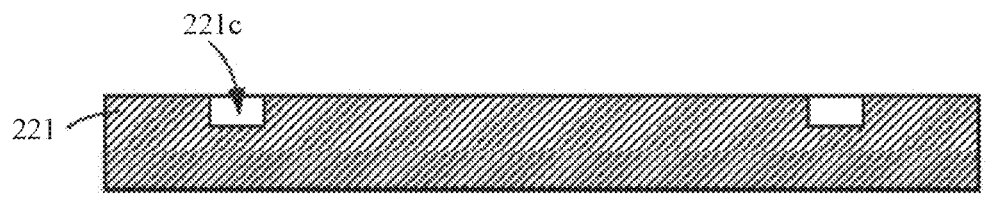
FIG. 14b is a cross-sectional view of a structure shown in FIG. 14a along a line III-III.

Optionally, in some implementations, as shown in FIG. 14a and FIG. 14b, a quantity of the plurality of grooves 221c is less than a quantity of the plurality of metal wires 2311. Correspondingly, as shown in FIG. 7i, the plurality of metal wires 2311 are formed in the plurality of grooves 221c and on the surface that is of the first protective layer 221 and that is away from the carrier 3X).

It may be understood that, based on the foregoing various implementations, the various implementations are combined into different combinations, to adjust positions of the plurality of metal wires 2311 (for example, all the plurality of metal wires 2311 are formed in the grooves 221c, or are formed on the surface of the first protective layer 221 and in the plurality of grooves 221c), and to adjust depths and/or widths of the grooves 221c, and the like, so that a plurality of metal wires 2311 at a same wiring layer 231 can have a same depth and a same width or different depths and different widths. In this way, the plurality of metal wires 2311 at the same wiring layer 231 have a same through-current capability or different through-current capabilities, and can transmit signals of a same type or different types.

Step 1104: Form, at the wiring layer 231, an insulation layer 232 that entirely covers the wiring layer 231.

In this embodiment, the insulation layer 232 may be made of a PI material. The insulation layer 232 may be formed by applying PI solution at the first protective layer 221 and the wiring layer 231 and then performing a baking and curing process.

Step 1105: Form, at the insulation layer 232, a shielding layer 233 that entirely covers the wiring layer 231.

In this embodiment, the shielding layer 233 is a metal layer, that is, a ground (GND) layer, and a material may be a common metal with excellent conductivity, such as Ti—Al or Ti—Cu. The shielding layer 233 is used to provide an isolation and shielding function to prevent signals transmitted by the plurality of metal wires 2311 at the wiring layer 231 from interfering with a line inside the display panel 21.

Step 1106: Form a third protective layer 223 at the shielding layer 233.

In this embodiment, the third protective layer 223 may be made of a waterproof material such as SiNx, SiON, or SiOx.

The third protective layer 223 may be formed by using a chemical vapor deposition (CVD) process.

Step 1107: Form a second protective layer 222 at the third protective layer 223.

In this embodiment, the second protective layer 222 may be made of an insulating material such as PI. The second protective layer 222 may be formed by applying PI solution at the third protective layer 223 and then performing a baking and curing process.

In this embodiment, an organic PI layer (the first protective layer 221 and the second protective layer 222) and the third protective layer 223 (for example, a SiOx layer) cooperate with each other to form a structure for isolating water vapor, to provide a carrying function and a water vapor blocking function for the display panel 21.

Step 1108: Form a TFT layer 213 at the second protective layer 222.

In this embodiment, the TFT layer 213 is manufactured by using a semiconductor process and is an OLED drive circuit layer.

Figure 12B:
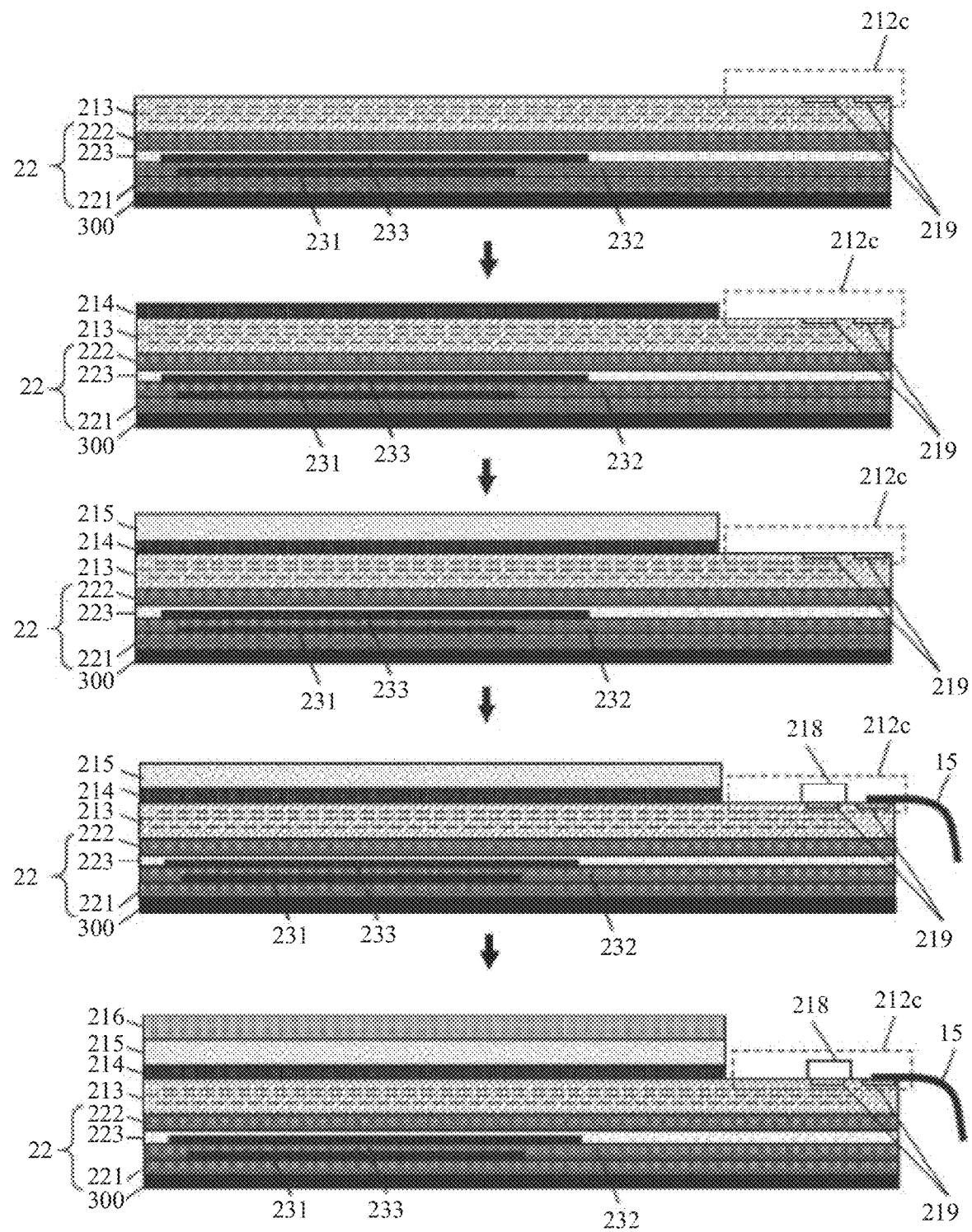
FIG. 12b is a schematic diagram 2 of a manufacturing process of a foldable display apparatus according to a first embodiment of this application.

As shown in FIG. 12b, a bonding area 212c is formed in an edge area of the TFT layer 213, and at least two bonding pads 219 are formed in the bonding area 212c.

Step 1109: Form an OLED layer 214 at the TFT layer 213.

In this embodiment, the OLED layer 214 may form a pixel by using an evaporation process.

Step 1110: Form a touch layer 215 at the OLED protective layer 214.

In this embodiment, the display apparatus 20b is a display screen with a touch function.

In another embodiment, the display apparatus 20b is a display screen with no touch function, and correspondingly, the touch layer 215 may be omitted.

Step 1111: Dispose a drive chip 218 and an FPC 15 in the bonding area 212c of the TFT layer 213.

In this embodiment, the drive chip 218 and the FPC 15 may be separately bonded on at least two bonding pads 219 in the bonding area 212c by using a Bonding process.

The drive chip 218 is bonded in the bonding area 212c by using the bonding pad 219, and is electrically connected to a drive circuit (not shown in the figure, for example, a data line or agate line) of the display panel 21 of the display apparatus 20b by using the corresponding bonding pad 219. For example, the drive chip 218 may include a time sequence control chip, a source control chip, and a gate control chip. The source control chip and the gate control chip are separately bonded in the bonding area 212c by using the bonding pad 219, and are electrically connected to the drive circuit of the display panel 21 by using the corresponding bonding pad 219, and the time sequence control chip is bonded in the bonding area 212c by using the bonding pad 219, and is separately electrically connected to the source control chip and the gate control chip by using the corresponding bonding pad 219.

Step 1112: Attach a polarizer 216 at the touch layer 215.

Step 1113: Remove the carrier 300.

In this embodiment, a bonding interface between the carrier 300 (a glass substrate) and the first protective layer 221 (a PI layer) may be focused by an excimer laser for scanning, to break a bond with weak interaction force between the carrier 300 and the first protective layer 221, so as to remove the carrier 300.

Step 1114: Open a window at a position that is at the first protective layer 221 and that is corresponding to a first bonding pad 2311a of each metal wire 2311, to form a first pad area 221a, so that the first bonding pad 2311a of each metal wire 2311 is exposed in the first pad area 221a; and open a window at a position that is at the first protective layer 221 and that is corresponding to a second bonding pad 2311b of each metal wire 2311, to form a second pad area 221b, so that the second bonding pad 2311b of each metal wire 2311 is exposed in the second pad area 221b.

In this embodiment, a partial structure of the first protective layer 221 that covers the wiring layer 231 may be removed by a photoetching technology or a laser etching technology to expose bonding pads at both ends of each metal wire 2311.

Step 1115: Attach a cover film 217 on the polarizer 216.

Step 1116: Dispose conductors in the first pad area 221a and the second pad area 221b.

Figure 12C:
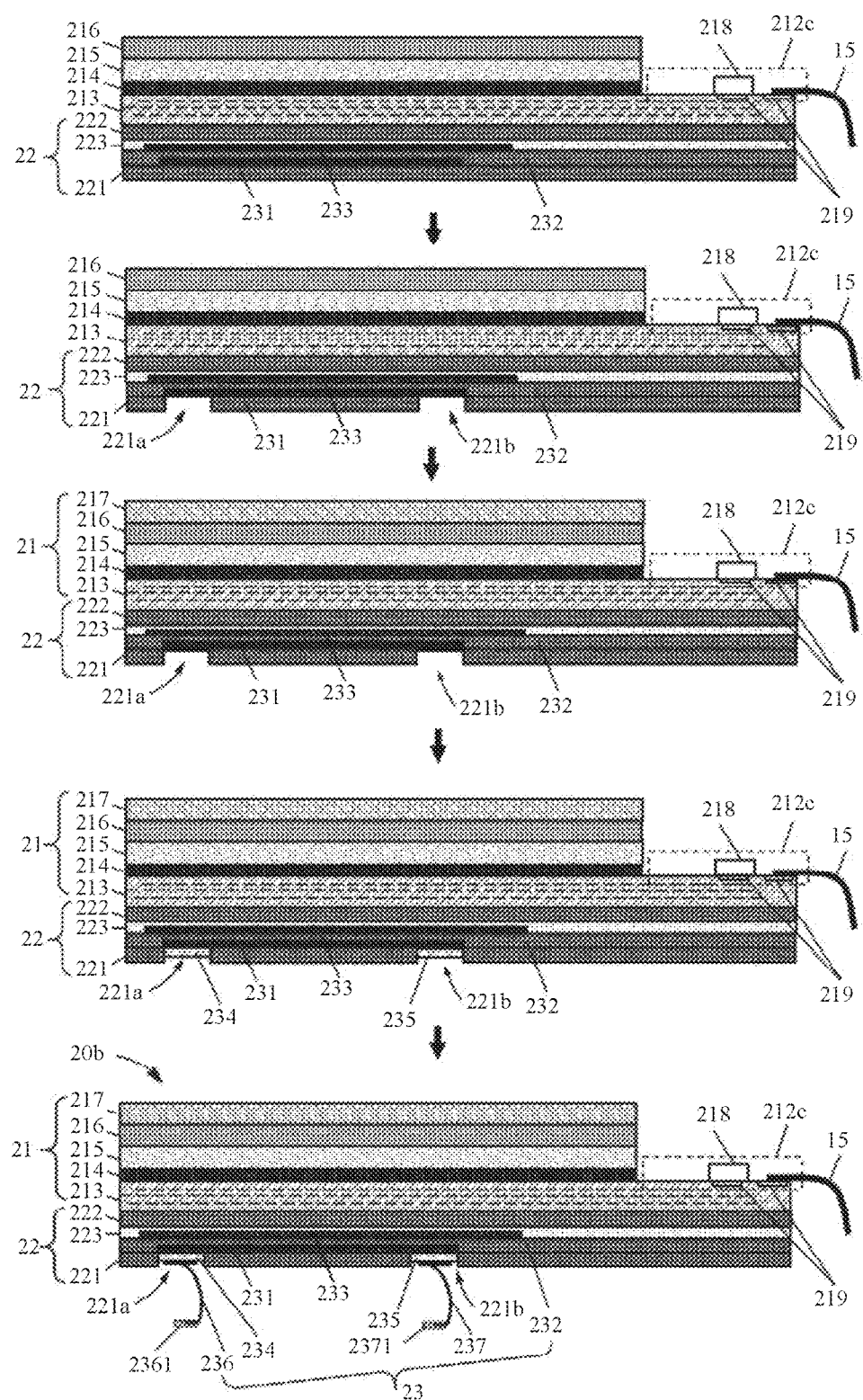
FIG. 12c is a schematic diagram 3 of a manufacturing process of a foldable display apparatus according to a first embodiment of this application.

Specifically, as shown in FIG. 12c, a conductor 234 is disposed in the first pad area 221a, and a conductor 235 is disposed in the second pad area 221b.

Step 1117: Weld a first end of a first connecting piece 236 to the first pad area 221a, and weld a first end of a second connecting piece 237 to the second pad area 221b, where a plurality of third bonding pads included at the first end of the first connecting piece 236 are electrically connected to the first bonding pads 2311a of the plurality of metal wires 2311 in a one-to-one manner, and a plurality of fourth bonding pads included at the first end of the second connecting piece 237 are electrically connected to the second bonding pads 2311b of the plurality of metal wires 2311 in a one-to-one manner.

Specifically, the first connecting piece 236 includes a plurality of first transmission lines (not shown in the figure) and a plurality of third bonding pads (not shown in the figure) that are disposed at the first end of the first connecting piece 236 and that are not connected to each other. The plurality of third bonding pads are electrically connected to the plurality of first transmission lines in a one-to-one manner. The second connecting piece 237 includes a plurality of second transmission lines (not shown in the figure) and a plurality of fourth bonding pads (not shown in the figure) disposed at the first end of the second connecting piece 237. The plurality of fourth bonding pads are electrically connected to the plurality of second transmission lines in a one-to-one manner.

In this embodiment, the conductor 234 is filled in the first pad area 221a, the conductor 235 is filled in the second pad area 221b, and both the conductors 234 and 235 are ACFs. The ACF may be separately pressed in the first pad area 221a and the second pad area 221b; in other words, the ACF covers each first bonding pad 2311a and each second bonding pad 2311b. Then, the first end of the first connecting piece 236 is attached to the ACF in the first pad area 221a, and the plurality of third bonding pads included in the first connecting piece 236 are in a one-to-one correspondence with the first bonding pads 2311a of the plurality of metal wires 2311; and the first end of the second connecting piece 237 is attached to the ACF in the second pad area 221b, and the plurality of fourth bonding pads included in the second connecting piece 237 are in a one-to-one correspondence with the second bonding pads 2311b of the plurality of metal wires 2311. Then, the ACF is heated and pressurized to weld two corresponding bonding pads. It may be understood that the plurality of third bonding pads of the first connecting piece 236 are insulated from each other and may be disposed in a third pad area (not shown in the figure) at the first end of the first connecting piece 236. A manner of arranging the plurality of third bonding pads in the third pad area is the same as a manner of arranging the first bonding pads 2311a of the plurality of metal wires 2311 in the first pad area 221a, to facilitate welding of the plurality of third bonding pads to the plurality of first bonding pads 2311a in the first pad area 221a. Similarly, the plurality of fourth bonding pads of the second connecting piece 237 are insulated from each other and may be disposed in a fourth pad area (not shown in the figure) at the first end of the second connecting piece 237. A manner of arranging the plurality of fourth bonding pads in the fourth pad area is the same as a manner of arranging the second bonding pads 2311b of the plurality of metal wires 2311 in the second pad area 221b, to facilitate welding of the plurality of fourth bonding pads to the plurality of second bonding pads 2311b in the second pad area 221b.

Because the ACF provides a conductive channel in a thickness direction of the display apparatus 20b and is insulated in a direction perpendicular to the thickness direction of the display apparatus 20b, the conductor 234 can implement one-to-one electrical connections between the first bonding pads 2311a of the plurality of metal wires 2311 and the plurality of third bonding pads of the first connecting piece 236, can effectively avoid a short circuit between the plurality of metal wires 2311, and can also avoid a short circuit between the plurality of first transmission lines included in the first connecting piece 236; and the conductor 235 can implement one-to-one electrical connections between the second bonding pads 2311b of the plurality of metal wires 2311 and the plurality of fourth bonding pads of the second connecting piece 237, can effectively avoid a short circuit between the plurality of metal wires 2311, and can also avoid a short circuit between the plurality of second transmission lines included in the second connecting piece 237.

In this way, through the conductor 234, signals on the plurality of third bonding pads of the first connecting piece 236 can be longitudinally conducted to the first bonding pads 2311a of the corresponding metal wires 2311 and then input into the corresponding metal wires 2311, or signals on the first bonding pads 2311a of the plurality of metal wires 2311 can be longitudinally conducted to the corresponding third bonding pads of the first connecting piece 236 and then input into corresponding first transmission lines. Through the conductor 235, signals on the second bonding pads 2311b of the plurality of metal wires 2311 can be longitudinally conducted to the corresponding fourth bonding pads of the second connecting piece 237 and then input into corresponding second transmission lines, or signals on the plurality of fourth bonding pads of the second connecting piece 237 can be longitudinally conducted to the second bonding pads 2311b of the corresponding metal wires 2311 and then input into the corresponding metal wires 2311.

In another embodiment, two corresponding bonding pads may alternatively be welded through laser welding. For example, a brazing filler metal is separately coated on the first bonding pad 2311a that is of the metal wire 2311 and that is exposed in the first pad area 221a and the second bonding pad 231l b that is of the metal wire 2311 and that is exposed in the second pad area 211b; and then the plurality of third bonding pads included in the first connecting piece 236 are attached to the first bonding pads 2311a of the plurality of metal wires 2311, and the plurality of fourth bonding pads included in the second connecting piece 237 are attached to the second bonding pads of the plurality of metal wires 2311; and then the two corresponding bonding pads are welded by locally heating the brazing filler metal by using lasers.

After step 1117 ends, a display apparatus 20b including the display panel 21, a multi-layer protective structure 22, and a mainboard connection structure 23 is obtained. After the display apparatus 20b is assembled to the housing assembly 11 of the terminal device 102 or 103, the second end of the first connecting piece 236 is electrically connected to the first mainboard 131, and the second end of the second connecting piece 237 is electrically connected to the second mainboard 132, to implement an interconnection and signal interactive transmission between the first mainboard 131 and the second mainboard 132.

According to the manufacturing method for a foldable display apparatus provided in this embodiment, the mainboard connection structure 23 is integrated into the multi-layer protective structure 22 on a back side of the display panel 21 by using a semiconductor process. When the terminal device 102 transmits, by using the wiring layer 231 included in the mainboard connection structure 23, all signals exchanged between the first mainboard 131 and the second mainboard 132, all lines of the through-going shaft connecting piece 17 can be transferred to the back side of the display panel 21 without using the through-going shaft connecting piece 17, so that bending performance of the terminal device 102 can be improved, and there is no reliability problem that the through-going shaft connecting piece 17 is damaged after being bent. Therefore, reliability of the interconnection between the two mainboards can be ensured, and further an overall thickness of the terminal device 102 can be reduced, thereby facilitating a thinning design of the terminal device 102.

When the terminal device 103 reserves the through-going shaft connecting piece 17 and transmits, by using the wiring layer 231 included in the mainboard connection structure 23, some signals exchanged between the first mainboard 131 and the second mainboard 132, some lines of the through-going shaft connecting piece 17 may be transferred to the back side of the display panel 21, to reduce a thickness of the through-going shaft connecting piece 17, so that the terminal device 103 has a smaller bending radius, bending performance is improved, reliability problems are reduced, and further an overall thickness of the terminal device 103 is reduced, to implement the thinning design of the terminal device 103.

Refer to FIG. 15A-FIG. 16*c* together. A second embodiment of this application further provides a manufacturing method for a foldable display apparatus. The display apparatus may correspond to the display apparatus 20*b* shown in FIG. 6 or FIG. 8, and the display apparatus 20*b* may be applied to the terminal device 102 shown in FIG. 4 and FIG. 5 or the terminal device 103 shown in FIG. 9 and FIG. 10.

The manufacturing method shown in FIG. 15A-FIG. 16*c* is similar to the manufacturing method shown in FIG. 11A-FIG. 12*c*, and a difference lies in that in the manufacturing method shown in FIG. 15A-FIG. 16*c*, each layer of structure of a display panel 21 is manufactured first, and then each layer of structure of a multi-layer protective structure 22 and each layer of structure of a mainboard connection structure 23 are formed through crossing.

Specifically, the manufacturing method includes but is not limited to the following steps.

Step 1501: Provide a carrier 300.

The carrier 300 may be a carrier such as a glass substrate.

Step 1502: Form a fourth protective layer 224 on the carrier 300.

In this embodiment, the fourth protective layer 224 may be made of an insulating material such as PI. The fourth protective layer 224 may be formed by applying PT solution on the carrier 300 and then performing a baking and curing process.

Step 1503: Form a third protective layer 223 at the fourth protective layer 224.

In this embodiment, the third protective layer 223 may be made of a waterproof material such as SiNx, SiON, or SiOx.

The third protective layer 223 may be formed by using a chemical vapor deposition (CVD) process.

Step 1504: Form a second protective layer 222 at the third protective layer 223.

Step 1505: Form a TFT layer 213 at the second protective layer 222.

Step 1506: Form an OLED layer 214 at the TFT layer 213.

Step 1507: Form a touch layer 215 at the OLED protective layer 214.

Figure 16A:
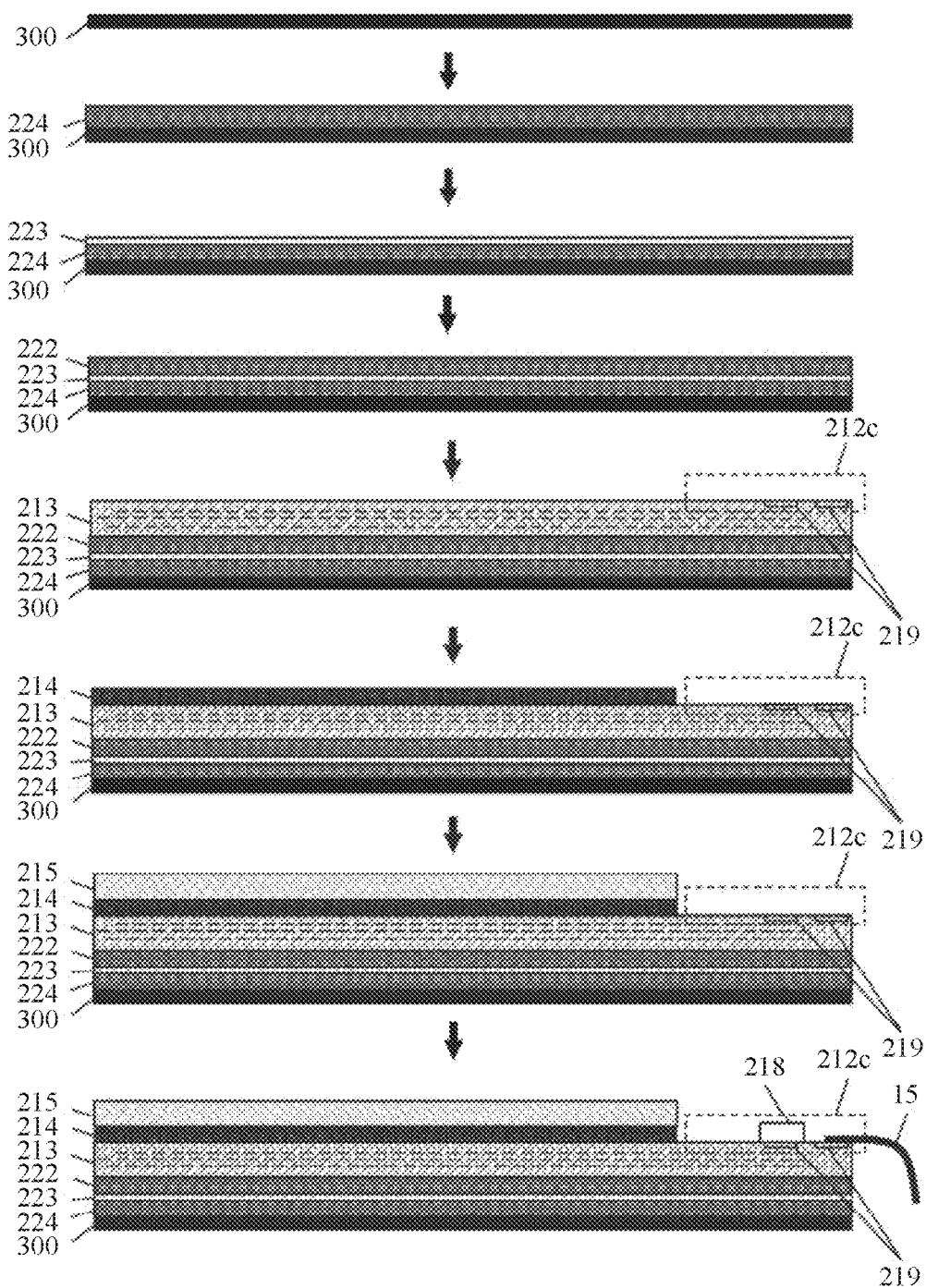
FIG. 16a is a schematic diagram 1 of a manufacturing process of a foldable display apparatus according to a second embodiment of this application.

Step 1508: Dispose a drive chip 218 and an FPC 15 (as shown in FIG. 16*a*) in a bonding area 212*c* of the TFT layer 213.

Step 1509: Attach a polarizer 216 at the touch layer 215.

Step 1510: Remove the carrier 300.

Figure 11A:
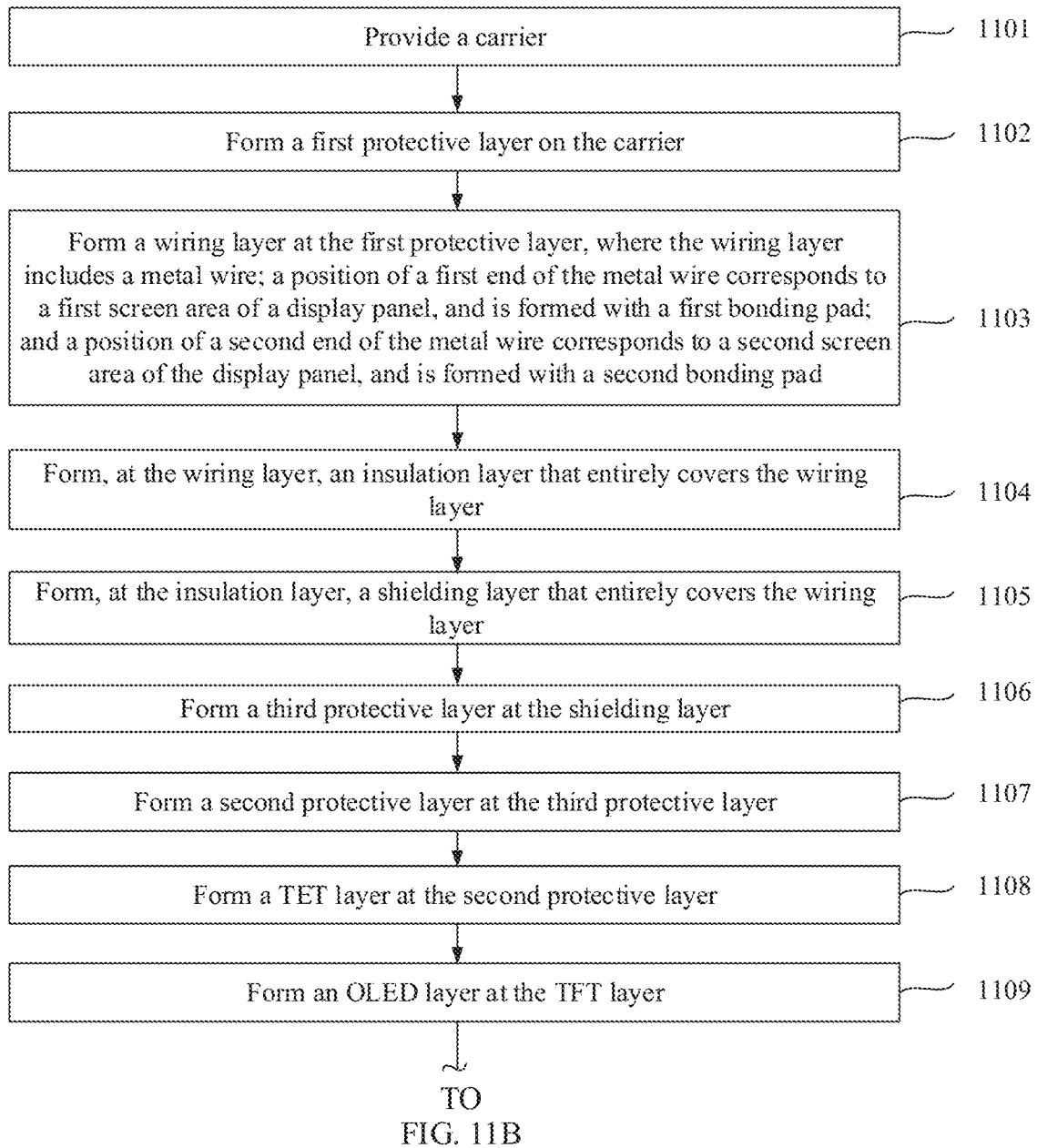
FIG. 11A and FIG. 11B are a flowchart of a manufacturing method for a foldable display apparatus according to a first embodiment of this application.
Figure 11B:
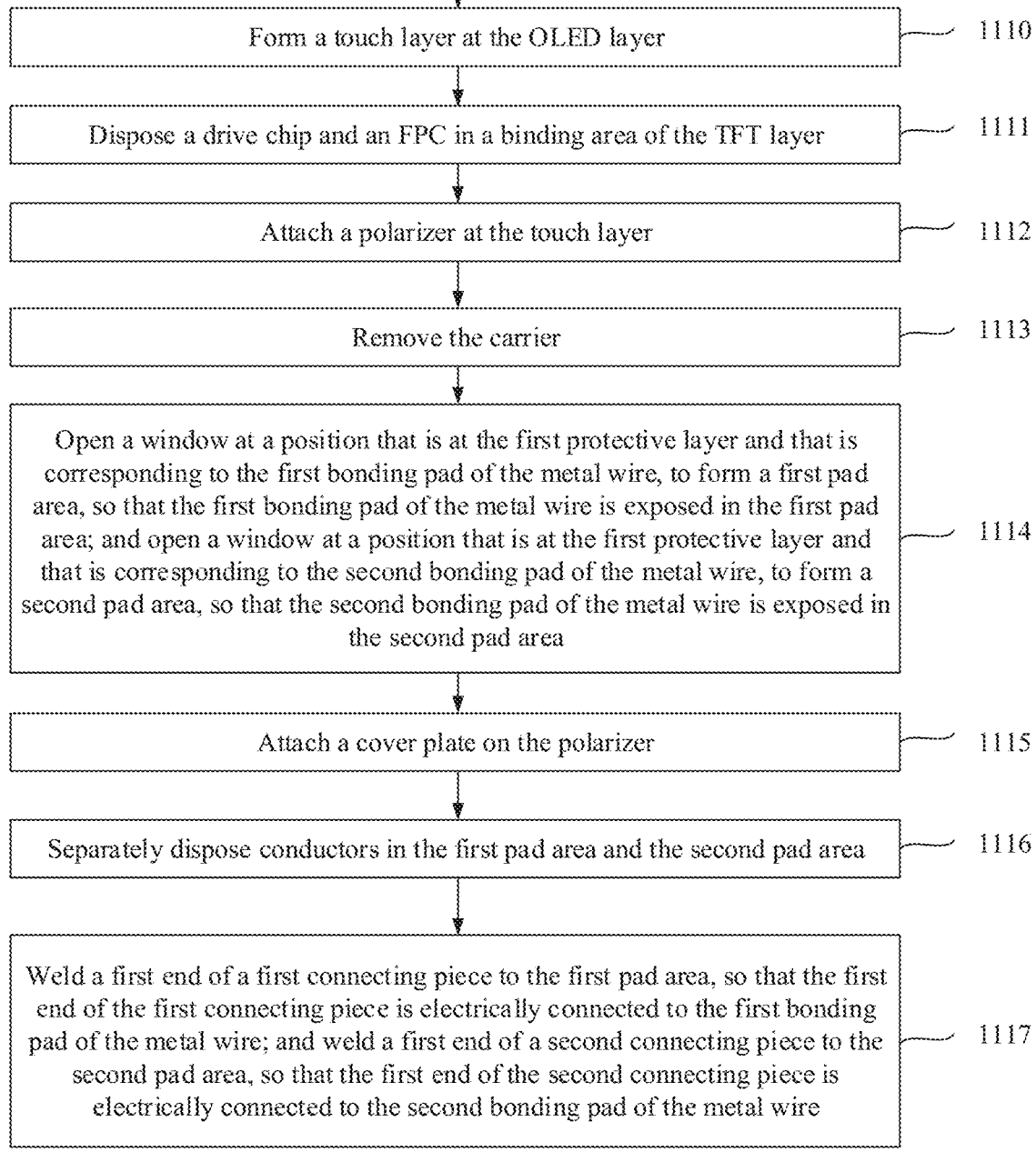
Figure 15A:
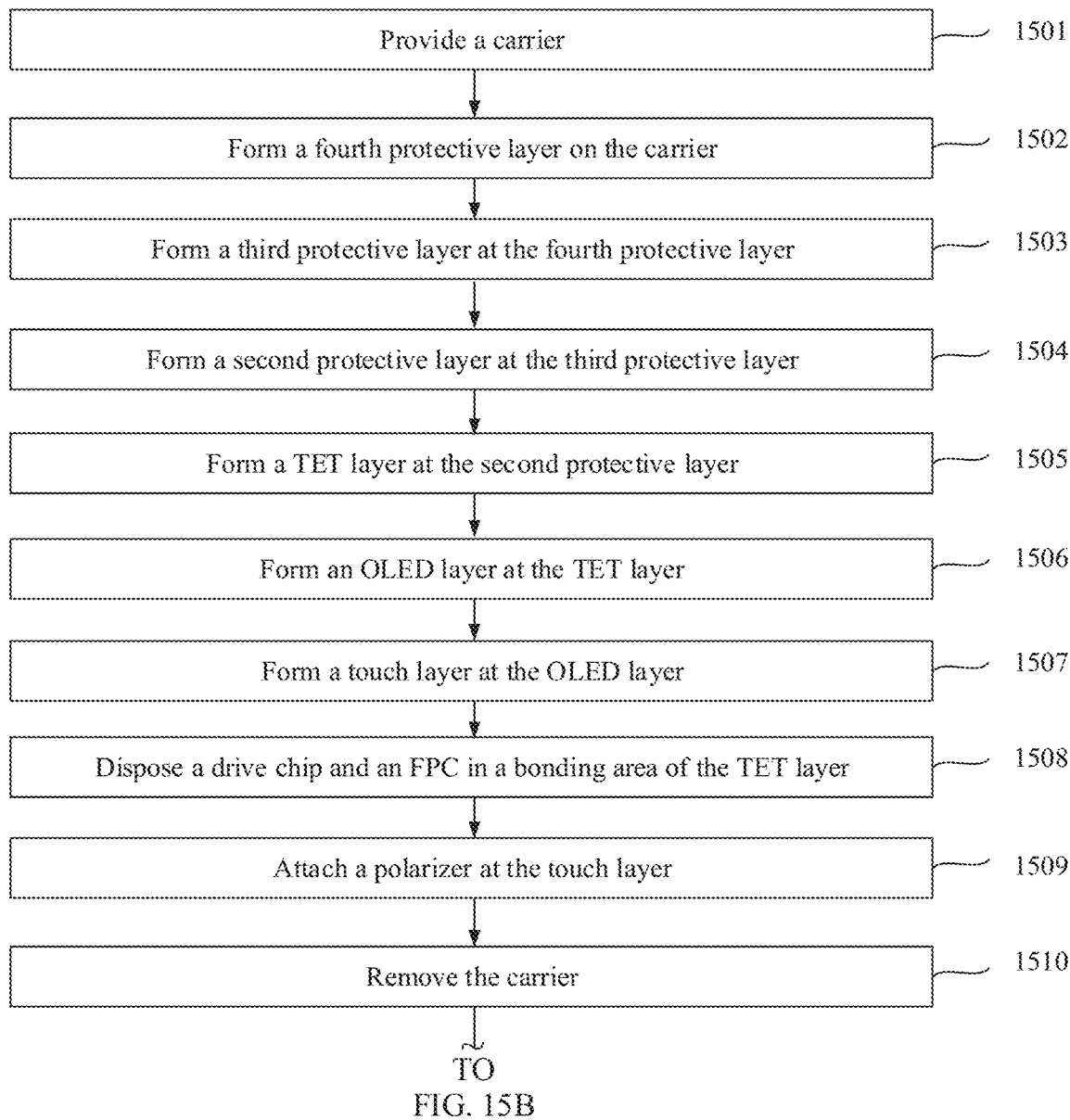

Technical details of step 1503-step 1510 shown in FIG. 15A and FIG. 15B are the same as or similar to technical details of step 1106-step 1113 shown in FIG. 11A and FIG. 11B. For specific technical details of step 1503-step 1510, refer to the foregoing specific descriptions. Details are not repeated herein.

It may be understood that, after step 1510 ends, each layer of structure of the display panel 21 and a partial stacked structure of the multi-layer protective structure 22 may be obtained, and the display panel 21 is carried on the multi-layer protective structure 22.

Step 1511: Form a shielding layer 233 on a surface that is of the fourth shielding layer 224 and that is away from the display panel 21.

In this embodiment, the shielding layer 233 is a metal layer, that is, a ground (GND) layer, and a material may be a common metal with excellent conductivity, such as Ti—Al or Ti—Cu. The shielding layer 233 is used to provide an isolation and shielding function to prevent signals transmitted by the plurality of metal wires 2311 at the wiring layer 231 from interfering with a line inside the display panel 21.

Step 1512: Form an insulation layer 232 at the shielding layer 233.

In this embodiment, the insulation layer 232 may be made of a PI material. The insulation layer 232 may be formed by applying PI solution at the shielding layer 233 and then performing a baking and curing process.

Step 1513: Form a wiring layer 231 at the insulation layer 232.

The wiring layer 231 includes a metal wire. In this embodiment, the wiring layer 231 includes a plurality of metal wires 2311 that are not connected to each other. A position of a first end of each metal wire 2311 corresponds to a first screen area 212*a* of the display panel 21, and is formed with a first bonding pad 2311*a*. A position of a second end of each metal wire 2311 corresponds to a second screen area 212*b* of the display panel 21, and is formed with a second bonding pad 2311*b*.

In this embodiment, the shielding layer 233 entirely covers the wiring layer 231.

Figure 16B:
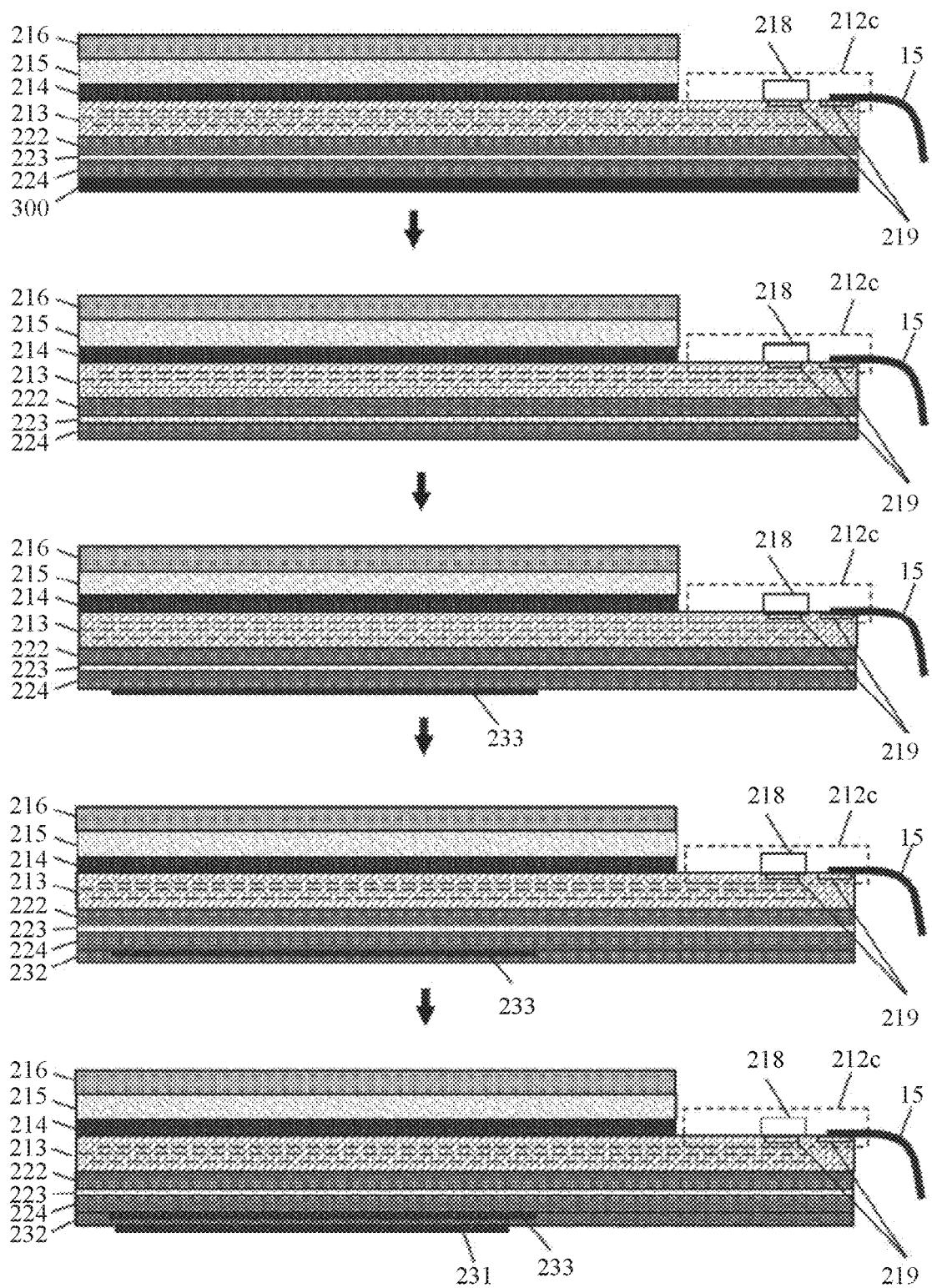
FIG. 16b is a schematic diagram 2 of a manufacturing process of a foldable display apparatus according to a second embodiment of this application.

In an embodiment, as shown in FIG. 16*b*, the plurality of metal wires 2311 are all formed on a surface that is of the insulation layer 232 and that is away from the shielding layer 233.

Optionally, in another embodiment, step 1513 may specifically include:

disposing a plurality of grooves 221*c* on the surface that is of the insulation layer 232 and that is away from the shielding layer 233.

The plurality of metal wires 2311 of the wiring layer 231 are formed in the plurality of grooves 221*c* at the insulation layer 232, or the plurality of metal wires 2311 of the wiring layer 231 are formed in the plurality of grooves 221*c* and on the surface that is of the insulation layer 232 and that is away from the shielding layer 233.

Other technical details of step 1513 shown in FIG. 15B are the same as or similar to technical details of step 1103 shown in FIG. 11A. For other specific technical details of step 1513, refer to the foregoing specific descriptions of step 1103. Details are not repeated herein.

Step 1514: Form a first protective layer 221 at the wiring layer 231.

In this embodiment, the first protective layer 221 may be made of an insulating material such as PI. The first protective layer 221 may be formed by applying PI solution at the wiring layer 231 and then performing a baking and curing process.

In this embodiment, an organic PI layer (the first protective layer 221, the second protective layer 222, and the fourth protective layer 224) and the third protective layer 223 (for example, a SiOx layer) cooperate with each other to form a structure for isolating water vapor, to provide a carrying function and a water vapor blocking function for the display panel 21.

Step 1515: Open a window at a position that is at the first protective layer 221 and that is corresponding to a first bonding pad 2311a of each metal wire 2311, to form a first pad area 221a, so that the first bonding pad 2311a of each metal wire 2311 is exposed in the first pad area 221a; and open a window at a position that is at the first protective layer 221 and that is corresponding to a second bonding pad 2311b of each metal wire 2311, to form a second pad area 221b, so that the second bonding pad 2311b of each metal wire 2311 is exposed in the second pad area 221b.

Step 1516: Attach a cover film 217 on the polarizer 216.

Step 1517: Dispose conductors in the first pad area 221a and the second pad area 221b.

Figure 16C:
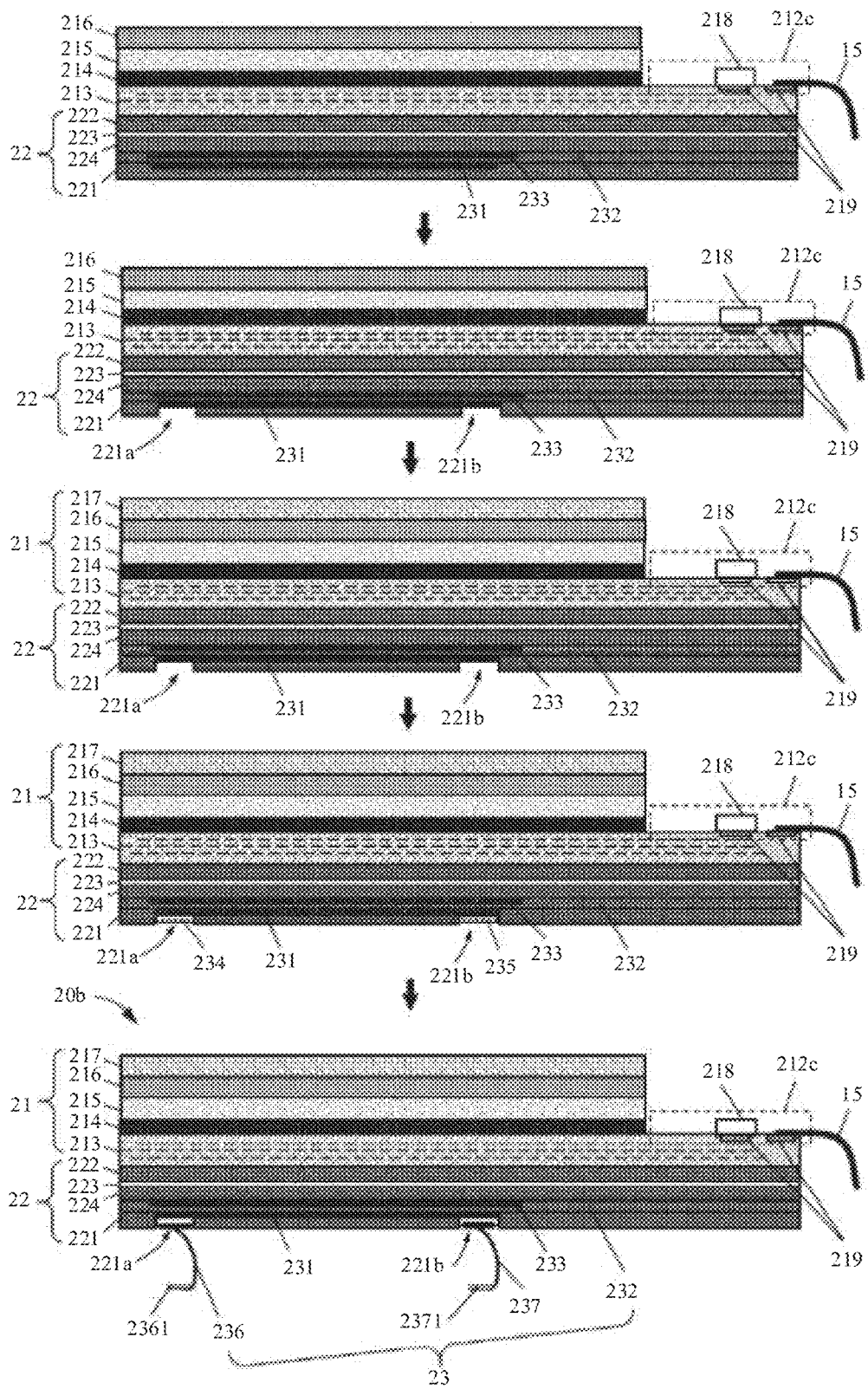
FIG. 16c is a schematic diagram 3 of a manufacturing process of a foldable display apparatus according to a second embodiment of this application.

Specifically, as shown in FIG. 16c, a conductor 234 is disposed in the first pad area 221a, and a conductor 235 is disposed in the second pad area 221b.

Step 1518: Weld a first end of a first connecting piece 236 to the first pad area 221a, and weld a first end of the second connecting piece 237 to the second pad area 221b, where a plurality of third bonding pads included at the first end of the first connecting piece 236 are electrically connected to the first bonding pads 2311a of the plurality of metal wires 2311 in a one-to-one manner, and a plurality of fourth bonding pads included at the first end of the second connecting piece 237 are electrically connected to the second bonding pads 2311b of the plurality of metal wires 2311 in a one-to-one manner.

Technical details of step 1515-step 1518 shown in FIG. 15B are the same as or similar to technical details of step 1114-step 1117 shown in FIG. 11B. For specific technical details of step 1515-step 1518, refer to the foregoing specific descriptions of step 1114-step 1117. Details are not repeated herein.

The foregoing descriptions are merely some embodiments of this application, and the protection scope of this application is not limited thereto. Any person skilled in the art can easily conceive modifications or replacements within the technical scope of this application, and these modifications or replacements shall fall within the protection scope of this application. Therefore, the protection scope of this application shall be subject to the protection scope of claims.

What is claimed is:

1. A terminal device, comprising:
a first body including a first mainboard;
a second body including a second mainboard, wherein the first body and the second body are rotatably connected; and
a foldable display apparatus, comprising:
a flexible display panel, comprising a first screen area that corresponds to the first body and a second screen area that corresponds to the second body, wherein the first and second screen areas are configured to be folded relative to each other;
a multi-layer protective structure, configured to carry the flexible display panel, wherein the multi-layer protective structure comprises a first protective layer away from the flexible display panel; and
a mainboard connection structure, disposed inside the multi-layer protective structure, wherein the mainboard connection structure comprises:
a wiring layer, an insulation layer, and a shielding layer that are stacked at the first protective layer in sequence, wherein the shielding layer is closer to the flexible display panel than the wiring layer, and the shielding layer entirely covers the wiring layer, wherein the wiring layer comprises a metal wire, wherein a position of a first end of the metal wire corresponds to the first screen area, and is formed with a first bonding pad, wherein a position of a second end of the metal wire corresponds to the second screen area, and is formed with a second bonding pad, and wherein a first pad area in which the first bonding pad of the metal wire is exposed and a second pad area in which the second bonding pad of the metal wire is exposed are formed at the first protective layer;
a first connecting piece, wherein a first end of the first connecting piece is disposed in the first pad area and is electrically connected to the first bonding pad of the metal wire, and wherein a second end of the first connecting piece is electrically connected to the first mainboard; and
a second connecting piece, wherein a first end of the second connecting piece is disposed in the second pad area and is electrically connected to the second bonding pad of the metal wire, and wherein a second end of the second connecting piece is electrically connected to the second mainboard,
wherein the first connecting piece, the metal wire, and the second connecting piece implement an electrical connection between the first mainboard and the second mainboard and transmit at least a part of signals exchanged between the first mainboard and the second mainboard.

2. The terminal device of claim 1, wherein the wiring layer comprises a plurality of metal wires that are not connected to each other.

3. The terminal device of claim 2, wherein the plurality of metal wires have similar wiring patterns, or a wiring pattern of at least one of the plurality of metal wires is different from a wiring pattern of another of the plurality of metal wires.

4. The terminal device of claim 2, wherein the first connecting piece comprises a plurality of first transmission lines and a plurality of third bonding pads disposed at the first end of the first connecting piece, the plurality of third bonding pads are electrically connected to the plurality of first transmission lines in a one-to-one manner, and the plurality of third bonding pads are further electrically connected in a one-to-one manner to first bonding pads that are of the plurality of metal wires and that are exposed in the first pad area, and wherein the second connecting piece comprises a plurality of second transmission lines and a plurality of fourth bonding pads disposed at the first end of the second connecting piece, the plurality of fourth bonding pads are electrically connected to the plurality of second transmission lines in a one-to-one manner, and the plurality of fourth bonding pads are further electrically connected in a one-to-one manner to second bonding pads that are of the plurality of metal wires and that are exposed in the second pad area.

5. The terminal device of claim 4, wherein the mainboard connection structure further comprises conductors that are separately disposed in the first pad area and the second pad area, wherein a conductor disposed in the first pad area implements one-to-one electrical connections between the first bonding pads of the plurality of metal wires and the plurality of third bonding pads in the first connecting piece, and wherein a conductor disposed in the second pad area implements one-to-one electrical connections between the second bonding pads of the plurality of metal wires and the plurality of fourth bonding pads in the second connecting piece.

6. The terminal device of claim 5, wherein either a) the conductors are anisotropic conductive films, and the conductors are separately filled in the first pad area and the second pad area, or b) the conductors are brazing filler metals, and the conductors are separately coated on each first bonding pad and each second bonding pad of the plurality of metal wires.

7. The terminal device of claim 1, wherein the multi-layer protective structure further comprises:
   a second protective layer that is adjacent to the flexible display panel, wherein both the first protective layer and the second protective layer are made of an insulating material; and
   a third protective layer made of a waterproof material and located between the second protective layer and the shielding layer,
   wherein the first protective layer, the second protective layer, and the third protective layer cooperate with each other to form a structure for isolating water vapor, to provide a carrying function and a water vapor blocking function for the flexible display panel.

8. The terminal device of claim 7, wherein the multi-layer protective structure further comprises a fourth protective layer made of an insulating material and located between the third protective layer and the shielding layer, wherein the fourth protective layer to cooperates with the first protective layer, the second protective layer, and the third protective layer to form a structure for isolating water vapor, to provide a carrying function and a water vapor blocking function for the flexible display panel.

9. The terminal device of claim 1, further comprising a rotary connection structure connected between the first body and the second body, wherein the rotary connection structure implements a rotary connection between the first body and the second body, so that the first body and the second body are configured to be folded and unfolded relative to each other.

10. The terminal device of claim 9, wherein the terminal further comprising a through-going shaft connecting piece, wherein both ends of the through-going shaft connecting piece are respectively electrically connected to the first mainboard and the second mainboard, and the through-going shaft connecting piece implements an electrical connection between the first mainboard and the second mainboard and transmits a first part of signals exchanged between the first mainboard and the second mainboard, wherein the through-going shaft connecting piece is a flexible circuit board, and a middle part of the through-going shaft connecting piece is located at a position close to the rotary connection structure, and is bent or unfolded along with rotation of the rotary connection structure, wherein the mainboard connection structure transmits a second part of signals exchanged between the first mainboard and the second mainboard, and wherein the first part of signals and the second part of signals are different signals.

11. The terminal device of claim 10, further comprising a mounting channel disposed in the rotary connection structure, wherein the middle part of the through-going shaft connecting piece is located in the mounting channel on the rotary connection structure.

12. A method for manufacturing for a foldable display apparatus, the method comprising:
   forming a first protective layer on a carrier;
   forming a wiring layer at the first protective layer, wherein the wiring layer comprises a metal wire, wherein a position of a first end of the metal wire corresponds to a first screen area of a flexible display panel, and is formed with a first bonding pad, and wherein a position of a second end of the metal wire corresponds to a second screen area of the flexible display panel, and is formed with a second bonding pad;
   forming, at the wiring layer, an insulation layer that entirely covers the wiring layer;
   forming, at the insulation layer, a shielding layer that entirely covers the wiring layer;
   removing the carrier;
   opening a window at a position at the first protective layer and corresponding to the first bonding pad of the metal wire, to form a first pad area, so that the first bonding pad of the metal wire is exposed in the first pad area;
   opening a window at a position at the first protective layer and corresponding to the second bonding pad of the metal wire, to form a second pad area, so that the second bonding pad of the metal wire is exposed in the second pad area;
   welding a first end of a first connecting piece to the first pad area, so that the first end of the first connecting piece is electrically connected to the first bonding pad of the metal wire; and
   welding a first end of a second connecting piece to the second pad area, so that the first end of the second connecting piece is electrically connected to the second bonding pad of the metal wire.

13. The method of claim 12, wherein the wiring layer comprises a plurality of metal wires that are not connected to each other, and forming the wiring layer at the first protective layer comprises:
   disposing a plurality of grooves on a surface of the first protective layer that is away from the carrier; and
   forming the plurality of metal wires of the wiring layer in the plurality of grooves, or forming the plurality of metal wires of the wiring layer in the plurality of grooves and on the surface that is of the first protective layer and that is away from the carrier,
   wherein either a) the plurality of grooves are the same in depth, or a depth of at least one of the plurality of grooves is greater than a depth of another groove in the plurality of grooves, or b) the plurality of grooves are the same in width, or a width of at least one of the plurality of grooves is greater than a width of another groove in the plurality of grooves.

14. The method of claim 12, wherein the wiring layer comprises a plurality of metal wires that are not connected to each other, and wherein each of the plurality of metal wires has a same width, or a width of at least one of the plurality of metal wires is greater than a width of another metal wire in the plurality of metal wires.

15. The method of claim 12, wherein the wiring layer comprises a plurality of metal wires that are not connected to each other, wherein the first connecting piece comprises a plurality of first transmission lines and a plurality of third bonding pads disposed at the first end of the first connecting piece, the plurality of third bonding pads are electrically connected to the plurality of first transmission lines in a one-to-one manner, and the plurality of third bonding pads are further electrically connected in a one-to-one manner to first bonding pads that are of the plurality of metal wires and that are exposed in the first pad area, and wherein the second connecting piece comprises a plurality of second transmission lines and a plurality of fourth bonding pads disposed at the first end of the second connecting piece, the plurality of fourth bonding pads are electrically connected to the plurality of second transmission lines in a one-to-one manner, and the plurality of fourth bonding pads are further electrically connected in a one-to-one manner to second bonding pads that are of the plurality of metal wires and that are exposed in the second pad area, the method further comprising separately disposing conductors in the first pad area and the second pad area, wherein a conductor disposed in the first pad area implements one-to-one electrical connections between the first bonding pads of the plurality of metal wires and the plurality of third bonding pads in the first connecting piece, and wherein a conductor disposed in the second pad area implements one-to-one electrical connections between the second bonding pads of the plurality of metal wires and the plurality of fourth bonding pads in the second connecting piece.

16. A method for manufacturing a foldable display apparatus, the method comprising:
providing a display panel and a partial structure of a multi-layer protective structure, wherein the display panel is carried on the multi-layer protective structure;
forming a shielding layer on a surface that is of the multi-layer protective structure that is away from the display panel;
forming an insulation layer at the shielding layer;
forming a wiring layer at the insulation layer, wherein the wiring layer comprises a metal wire, wherein a position of a first end of the metal wire corresponds to a first screen area of the display panel, and is formed with a first bonding pad, wherein a position of a second end of the metal wire corresponds to a second screen area of the display panel, and is formed with a second bonding pad, and wherein the shielding layer entirely covers the wiring layer;
forming a first protective layer of the multi-layer protective structure at the wiring layer;
opening a window at a position at the first protective layer and corresponding to the first bonding pad of the metal wire, to form a first pad area, so that the first bonding pad of the metal wire is exposed in the first pad area;
opening a window at a position is at the first protective layer and that is corresponding to the second bonding pad of the metal wire, to form a second pad area, so that the second bonding pad of the metal wire is exposed in the second pad area;
welding a first end of a first connecting piece to the first pad area, so that the first end of the first connecting piece is electrically connected to the first bonding pad of the metal wire; and
welding a first end of a second connecting piece to the second pad area, so that the first end of the second connecting piece is electrically connected to the second bonding pad of the metal wire.

17. The method of claim 16, wherein the wiring layer comprises a plurality of metal wires that are not connected to each other, and forming the wiring layer at the insulation layer comprises:

disposing a plurality of grooves on a surface of the insulation layer that is away from the shielding layer; and
forming the plurality of metal wires of the wiring layer in the plurality of grooves, or forming the plurality of metal wires of the wiring layer in the plurality of grooves and on the surface that is of the insulation layer and that is away from the shielding layer,
wherein either a) the plurality of grooves are the same in depth, or a depth of at least one of the plurality of grooves is greater than a depth of another groove in the plurality of grooves;
, or b) the plurality of grooves are the same in width, or a width of at least one of the plurality of grooves is greater than a width of another groove in the plurality of grooves.

18. The method of claim 16, wherein the wiring layer comprises a plurality of metal wires that are not connected to each other, and wherein each of the plurality of metal wires has a same thickness, or a thickness of at least one of the plurality of metal wires is greater than a thickness of another of the plurality of metal wires.

19. The method of claim 16, wherein the wiring layer comprises a plurality of metal wires that are not connected to each other, wherein the first connecting piece comprises a plurality of first transmission lines and a plurality of third bonding pads disposed at the first end of the first connecting piece, the plurality of third bonding pads are electrically connected to the plurality of first transmission lines in a one-to-one manner, and the plurality of third bonding pads are further electrically connected in a one-to-one manner to first bonding pads that are of the plurality of metal wires and that are exposed in the first pad area, and wherein the second connecting piece comprises a plurality of second transmission lines and a plurality of fourth bonding pads disposed at the first end of the second connecting piece, the plurality of fourth bonding pads are electrically connected to the plurality of second transmission lines in a one-to-one manner, and the plurality of fourth bonding pads are further electrically connected in a one-to-one manner to second bonding pads that are of the plurality of metal wires and that are exposed in the second pad area, the method further comprising separately disposing conductors in the first pad area and the second pad area, wherein a conductor disposed in the first pad area is used to implements one-to-one electrical connections between the first bonding pads of the plurality of metal wires and the plurality of third bonding pads in the first connecting piece, and wherein a conductor disposed in the second pad area implements one-to-one electrical connections between the second bonding pads of the plurality of metal wires and the plurality of fourth bonding pads in the second connecting piece.

20. The terminal device of claim 2, wherein each of the plurality of metal wires has a same width, and each of the plurality of metal wires has a same thickness.

* * * * *

UNITED STATES PATENT AND TRADEMARK OFFICE
CERTIFICATE OF CORRECTION

PATENT NO. : 12,501,797 B2  
APPLICATION NO. : 18/253274  
DATED : December 16, 2025  
INVENTOR(S) : Caihua Ding, Xianbo Zong and Xueping Guo Page 1 of 1

It is certified that error appears in the above-identified patent and that said Letters Patent is hereby corrected as shown below:

In the Claims

Claim 8, Column 39, Line 30: "layer to cooperates with" should read "layer cooperates with"

Claim 10, Column 39, Lines 42-43: "9, wherein the terminal further comprising" should read "9, further comprising"

Claim 16, Column 41, Line 23: "surface that is of the" should read "surface of the"

Claim 17, Column 42, Lines 12-13: "grooves;, or b) the" should read "grooves, or b) the"

Claim 19, Column 42, Line 46: "area is used to implements" should read "area implements"

Signed and Sealed this  
Twenty-seventh Day of January, 2026

John A. Squires  
*Director of the United States Patent and Trademark Office*